(12) United States Patent
Nolan et al.

(10) Patent No.: US 9,242,663 B1
(45) Date of Patent: Jan. 26, 2016

(54) WAGON WITH MINIMIZED-PLAY COLLAPSIBLE WALL

(71) Applicant: DRAGONFLY GEAR, LLC, Milton, GA (US)

(72) Inventors: Patrick Nolan, Royersford, PA (US); Mike Dotsey, Chester Springs, PA (US); Noah Dingler, Phoenixville, PA (US); Brady Schroeder, Milton, GA (US)

(73) Assignee: DRAGONFLY GEAR, LLC, Milton, GA (US)

( * ) Notice: Subject to any disclaimer, the term of this patent is extended or adjusted under 35 U.S.C. 154(b) by 0 days.

(21) Appl. No.: 14/811,340

(22) Filed: Jul. 28, 2015

Related U.S. Application Data

(62) Division of application No. 14/444,380, filed on Jul. 28, 2014, now Pat. No. 9,108,656.

(51) Int. Cl.
*A63C 9/00* (2012.01)
*B62B 3/02* (2006.01)
*B62B 3/00* (2006.01)

(52) U.S. Cl.
CPC ............... *B62B 3/022* (2013.01); *B62B 3/007* (2013.01)

(58) Field of Classification Search
CPC .......... B62B 3/022; B62B 3/007; B62K 9/00; B62K 7/08
USPC .................................................. 280/647–648
See application file for complete search history.

(56) References Cited

U.S. PATENT DOCUMENTS

| | | | | |
|---|---|---|---|---|
| 5,957,482 | A * | 9/1999 | Shorter | B62B 3/007 280/47.35 |
| 8,191,907 | B2 * | 6/2012 | Watson | B62B 3/007 280/30 |
| 8,453,771 | B1 * | 6/2013 | Hirschfeld | B60L 8/003 180/19.1 |
| 9,108,656 | B1 * | 8/2015 | Nolan | B62B 3/02 |
| 2005/0012307 | A1 * | 1/2005 | Shapiro | B62B 1/206 280/651 |
| 2010/0072730 | A1 * | 3/2010 | Shapiro | B62B 3/007 280/639 |

* cited by examiner

*Primary Examiner* — John Walters
*Assistant Examiner* — James Triggs
(74) *Attorney, Agent, or Firm* — Gardner Groff Greenwald & Villanueva, PC

(57) ABSTRACT

A wagon includes a base and at least two upstanding walls forming a container for cargo. At least one of the upstanding walls is pivotally mounted to the base for pivoting between an unfolded position for use and a folded position for storage and transport. In some embodiments, the wagon includes a minimized-play feature that eliminates slack or play when in the unfolded use position for structural integrity. And in some embodiments, the wagon includes a gang-operated latch system for releasably securing the walls in the unfolded use position that is quick, easy, and reliable to use for folding and unfolding.

20 Claims, 29 Drawing Sheets

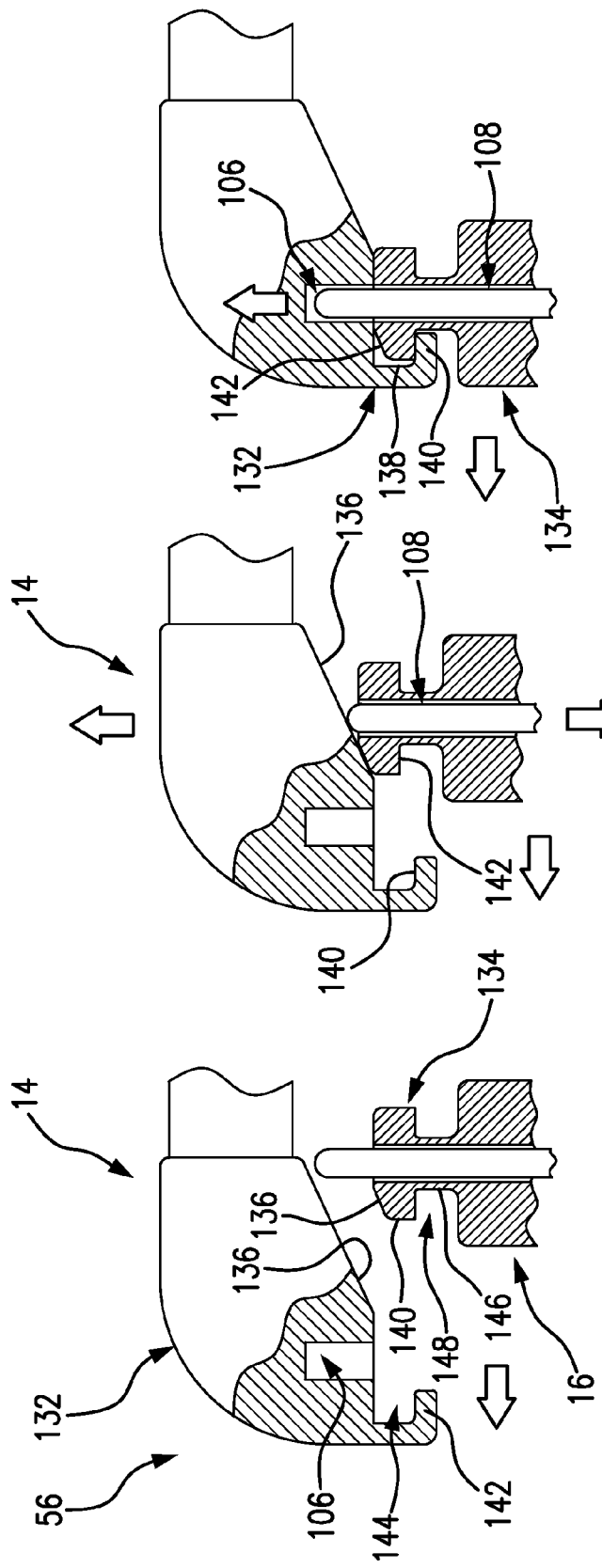

WAGON WITH MINIMIZED-PLAY COLLAPSIBLE WALL

CROSS-REFERENCE TO RELATED APPLICATION

This application is a divisional of U.S. Non-Provisional patent application Ser. No. 14/444,380, filed Jul. 28, 2014, which claims the priority benefit of U.S. Provisional Patent Application Ser. No. 61/877,266, filed Sep. 12, 2013, all of which are hereby incorporated herein by reference.

TECHNICAL FIELD

The present invention relates generally to consumer-use wagons for carrying children and other cargo, and in particular to such wagons with one or more walls that collapse into a compact arrangement for storage.

BACKGROUND

Conventional consumer-use wagons are commonly used for holding and carrying cargo such as children, their toys, beach items (e.g., chairs, towels, and sand buckets/shovels), and sports equipment (e.g., balls, bats, and helmets). Such wagons typically include a generally rectangular base and four generally rectangular upright walls forming an open-topped container, with a pull handle pivotally coupled to the base front, and with four wheels rotationally mounted to the base bottom. A traditional and well-known wagon of this type is the classic RADIO FLYER wagon.

While these wagons have their advantages, they also have some drawbacks. For example, they tend to be bulky and occupy valuable storage space in the garage as well as in a parent's car or minivan. Efforts to address this drawback have produced some collapsible wagons designs. But these wagons have not proven sufficiently satisfactory, for example many have pivotal walls that have some "play" when latched into their upright locked positions thus allow some wiggling during use.

Accordingly, it can be seen that needs exist for improved features for securing collapsible walls of wagons in their upright position for use. It is to the provision of solutions to these and other problems that the present invention is primarily directed.

SUMMARY

Generally described, the present invention relates to a wagon including a base and at least two upstanding walls forming a container for cargo. At least one of the upstanding walls is pivotally mounted to the base for pivoting between an unfolded position for use and a folded position for storage and transport. In some embodiments, the wagon includes a minimized-play feature that eliminates slack or play when in the unfolded use position for structural integrity. And in some embodiments, the wagon includes a gang-operated latch system for releasably securing the walls in the unfolded use position that is quick, easy, and reliable to use for folding and unfolding.

The specific techniques and structures employed to improve over the drawbacks of the prior devices and accomplish the advantages described herein will become apparent from the following detailed description of example embodiments and the appended drawings and claims.

BRIEF DESCRIPTION OF THE DRAWINGS

FIG. 30 is a detail schematic diagram of the latch system of FIG. 27, showing one of the endwalls being pivoted toward one of the sidewalls.

FIG. 31 shows the latch system of FIG. 30 with the pivoting endwall engaging and resiliently deflecting the sidewall.

FIG. 32 shows the latch system of FIG. 31 with the pivoted endwall releasably locked to the deflected the sidewall.

DETAILED DESCRIPTION OF EXAMPLE EMBODIMENTS

Figure 1:
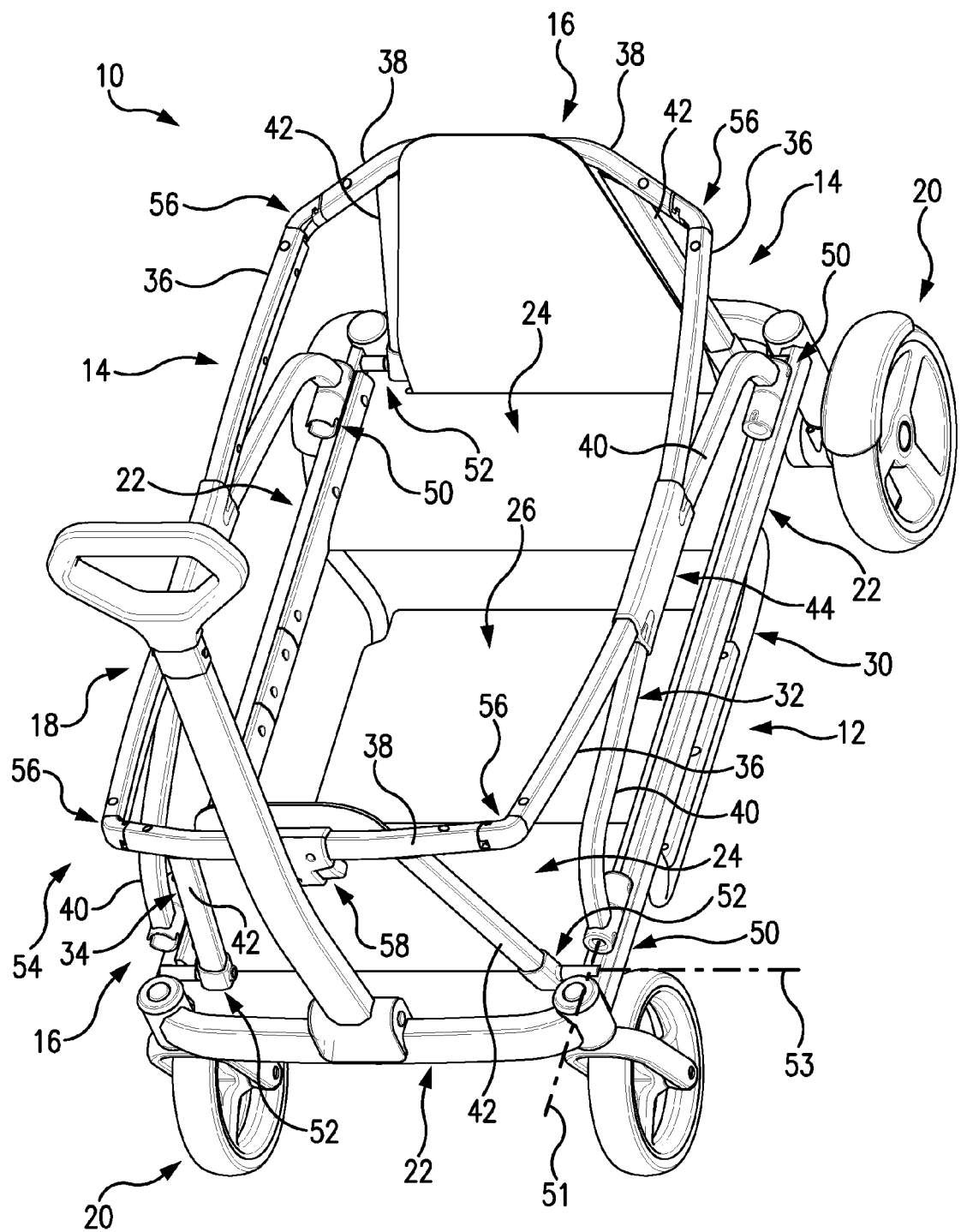
FIG. 1 is a perspective view of a collapsible wagon according to a first example embodiment of the present invention, shown with its peripheral sidewalls and endwalls as well as its pull handle in an unfolded position for use.

Generally described, the present invention relates to wagons that are at least partially collapsible by having at least one wall that is repositionable between a folded storage position and an unfolded use position. In typical commercial embodiments, the wagons are consumer-use wagons of the type commonly used for holding and carrying household cargo such as children, toys, beach items (e.g., chairs, towels, and sand buckets/shovels), sports equipment (e.g., balls, bats, and helmets), and gardening and do-it-yourself wagons for yard use. In other embodiments, the wagons are in the form of multi-use wagons, industrial-use wagons, utility trailers, medical or office carts, moving dollies, or other wheeled transport containers.

Turning now to the drawings, FIGS. 1-34 show a consumer-use wagon 10 according to a first example embodiment of the present invention. Referring particularly to FIGS. 1-4, the wagon 10 includes a base 12, two opposing upright sidewalls 14, two opposing upright endwalls 16, a pull handle 18, and wheels 20. The sidewalls 14 and the endwalls 16 extend upward (including bowed outward and not necessarily vertical) from the base 12 to cooperatively form an open-topped container for the cargo. The sidewalls 14 are typically longer than the endwalls 16 so that the resulting container is generally rectangular (in plan view). It should be noted that the sidewalls 14 and the endwalls 16 are sometimes referred to collectively herein as the peripheral walls 14/16 for convenience.

In the depicted embodiment, the base 12, the sidewalls 14, and the endwalls 16 are all generally rectangular and made of lightweight and strong plastic and metal, though in other embodiments they are provided in other shapes and/or made of composite or other materials, as is well-known in the art. The pull handle 18 is pivotally coupled to the base 12 at its front end so that it pivots between a folded storage position and an unfolded use position for pulling the wagon 10. And the wheels 20 are rotationally mounted to the base at its bottom surface, for example four wheels can be provided for supporting and rolling the wagon 10 as depicted. These aspects of the basic underlying design of the wagon 10 are conventional and well-known, so further details are not provided for brevity and clarity.

The base 12 of this embodiment includes a peripheral frame 22 that supports front and rear seat-pan panels 24, a footrest panel 26 between the seat-pans, and front and rear seatback panels 28. The seat-pans 24, the footrest 26, and the seatbacks 28 cooperatively form seats for children to sit in when riding in the wagon 10. The base frame 22 can be made of generally rectangular tubular metal (as depicted), solid rectangular bars or cylindrical rods, or other conventional structural members. The footrest 26 can be supported by and suspended from the seat-pans 24 by support members (e.g., similar structural members) 30. In other embodiments, the wagon is provided without the seats, or the seats are removable.

The depicted seatbacks 28 are pivotally mounted to the base 12, for example by conventional hinges to the seat-pans 24 as depicted, so that they pivot between a folded storage position generally flat against the seat-pans for compact storage and an unfolded use position generally upright for supporting a child's back when seated on the respective seat-pan. In some embodiments, the seatbacks 28 are also coupled to the endwalls 16 so that they pivot together, and in such embodiments the pivotal mounting to the base 12 can be eliminated. Details of the pivoting of the endwalls 16 are described below.

In the depicted embodiment, the base 12 has fixed peripheral dimensions, that is, it does not fold or otherwise collapse into a smaller footprint, that is, length and/or width (in plan views), or into a shorter height (in elevation views). In particular, the base frame 22 typically is rigid for structural strength (it has fixed dimensions of length and width as well as height) and does not include any hinges, pivots, swivels, or other joints that permit it to fold or otherwise collapse into a smaller arrangement. In other embodiments, the base frame includes such joints to permit folding into a compact arrangement for storage.

In addition, the sidewalls 14 and the endwalls 16 of the depicted embodiment each include a respective support frame 32 and 34. The sidewall frames 32 each include one or more (e.g., the depicted two) upper frame members 36 and the endwall frames 34 each include one or more (e.g., the depicted one) upper frame member 38, with these upper frame members cooperating to define a peripheral frame extending continuously about the wagon 10. And the sidewall frames 32 each include one or more (e.g., the depicted two) connecting frame members 40 and the endwall frames 34 each include one or more (e.g., the depicted two) connecting frame members 42, with these connecting frame members extending between the base frame 22 and their respective upper frame members 36 and 38. As such, the connecting frame members 40 and 42 extend generally upright, though not necessarily vertical, as can be seen by the steeply-sloped sidewall connecting frame members and the gently-sloped endwall connecting frame members of the depicted embodiment. The sidewall and endwall support frames 32 and 34 can be made of generally rectangular tubular metal (as depicted), solid rectangular bars or cylindrical rods, or other conventional structural members.

The sidewall connecting frame members 42 can be connected to the respective sidewall upper frame members 36 by a frame connector 44. In the depicted embodiment, with each sidewall frame 32 including two upper frame members 36 and two connecting frame members 42, the frame members are positioned in a generally X-shaped arrangement. And the frame connector 44 includes four connections arranged so that a front one of the sidewall upper frame members 36 is generally aligned with a rear one of the sidewall connecting frame members 42, and a rear one of the sidewall upper frame members is generally aligned with a front one of the sidewall connecting frame members.

In other embodiments, a single continuous sidewall upper frame member is provided and a single continuous sidewall connecting frame member is provided, with bends for example in their middle portions, and with the frame connector connecting the two frame members together in the same generally X-shaped and aligned arrangement. And in still other embodiments, the sidewall and/or endwall frames are provided in other forms, for example each can be provided by a single frame member that extends along and defines the wagon top and that bends downward at the corners, thereby forming an inverted and wide U. It will be understood that other configurations of sidewall and/or endwall frames (e.g., O-frames, H-frames, W-frames, M-frames, T-frames, V-frames, and the like) can be selected by persons of ordinary skill in the art to provide the functionality described herein, and such other configurations are contemplated by and within the scope of the invention.

Furthermore, the sidewalls 14 and the endwalls 16 of the depicted embodiment each include a respective cover 46 and 48 (see FIG. 13) mounted to and supported by their respective support frames 32 and 34. The covers 46 and 48 are typically not mounted to each other (or to other of the frame members) to permit them to pivot with their respective frame members, as described below. The covers 46 and 48 are typically provided by sheets of a flexible material such as woven or non-woven plastic, cotton, or a blend thereof. In other embodiments, the peripheral sidewalls and/or the endwalls include the frames but not the covers, they include rigid wall panels without structural frame members, or they are provided by other conventional peripheral structural wall elements. It will be understood that the term "wall" as used herein is intended to be broadly construed to include the depicted frames 32 and 34, as well as other similar structures, with or without covers, and not just solid one-piece panels. In addition, in some embodiments the base 12 includes side covers for the areas under the base frame and above the footrest (see FIG. 13).

Referring additionally to FIGS. 5-12, the wagon 10 includes features that permit the peripheral walls 14/16 to be pivotally repositioned between their unfolded use positions (FIGS. 1-4) and their folded storage positions (FIGS. 5-7 and 12). In particular, the wagon 10 includes pivotal couplings 50 and 52 that pivotally mount the peripheral sidewalls 14 and endwalls 16, respectively, to the base 12, and a gang-operated latch system 54 including latches 56 and actuators 58 for releasably locking the peripheral walls in the use position. For example, the pivotal couplings 50 and 52 can be mounted to the frame 22 of the base 12, as depicted, or to another part of the base such as the seat-pans 24. The pivotal couplings 50 and 52 and the latch system 54 can be provided by conventional components known in the art (e.g., pivot-pin couplings and snap-fit latches), or they can be provided by innovative components described below.

Figure 8:
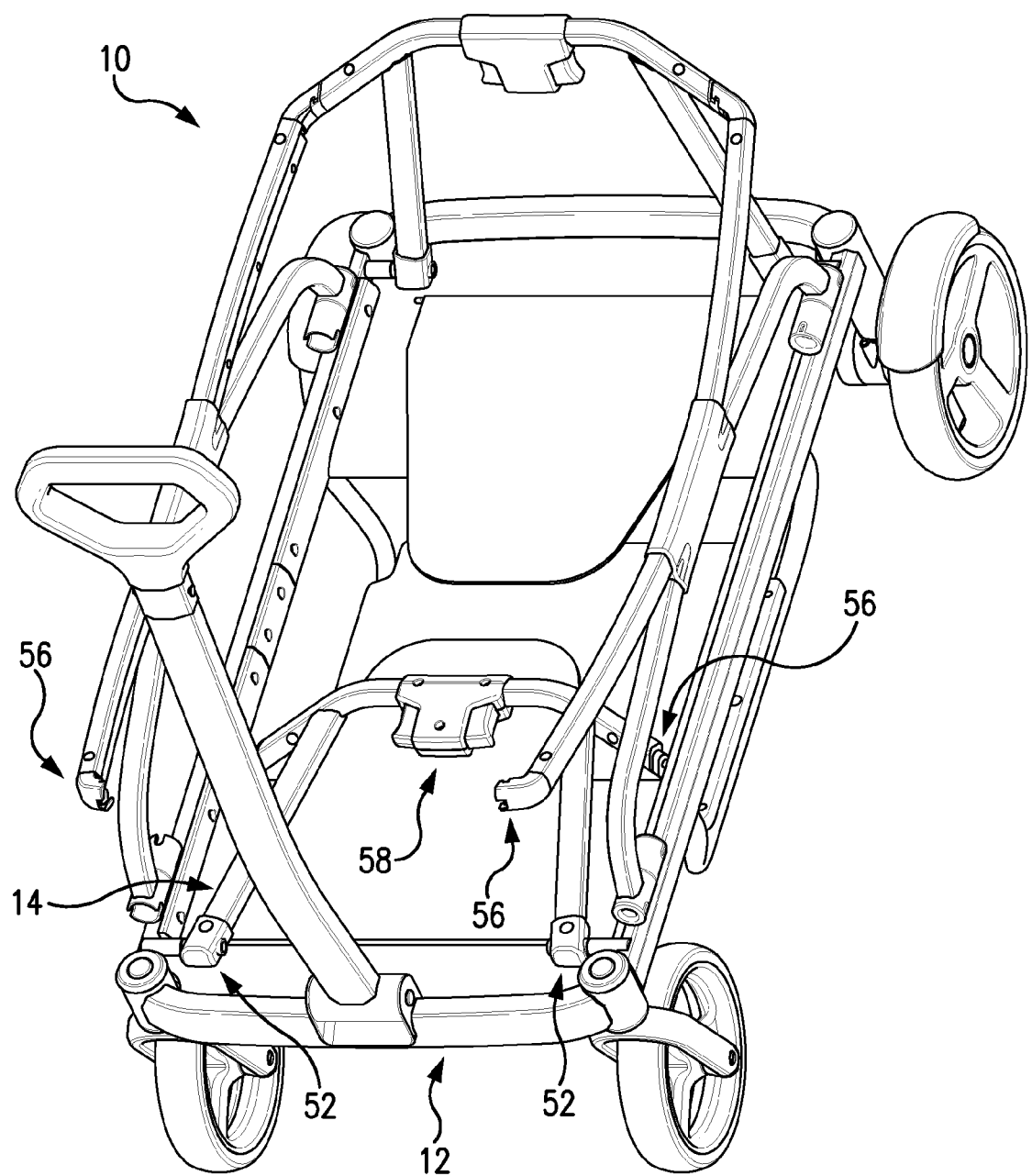
FIG. 8 shows the collapsible wagon of FIG. 1 with its front endwall folded down during a step of a collapsing method.
Figure 9:
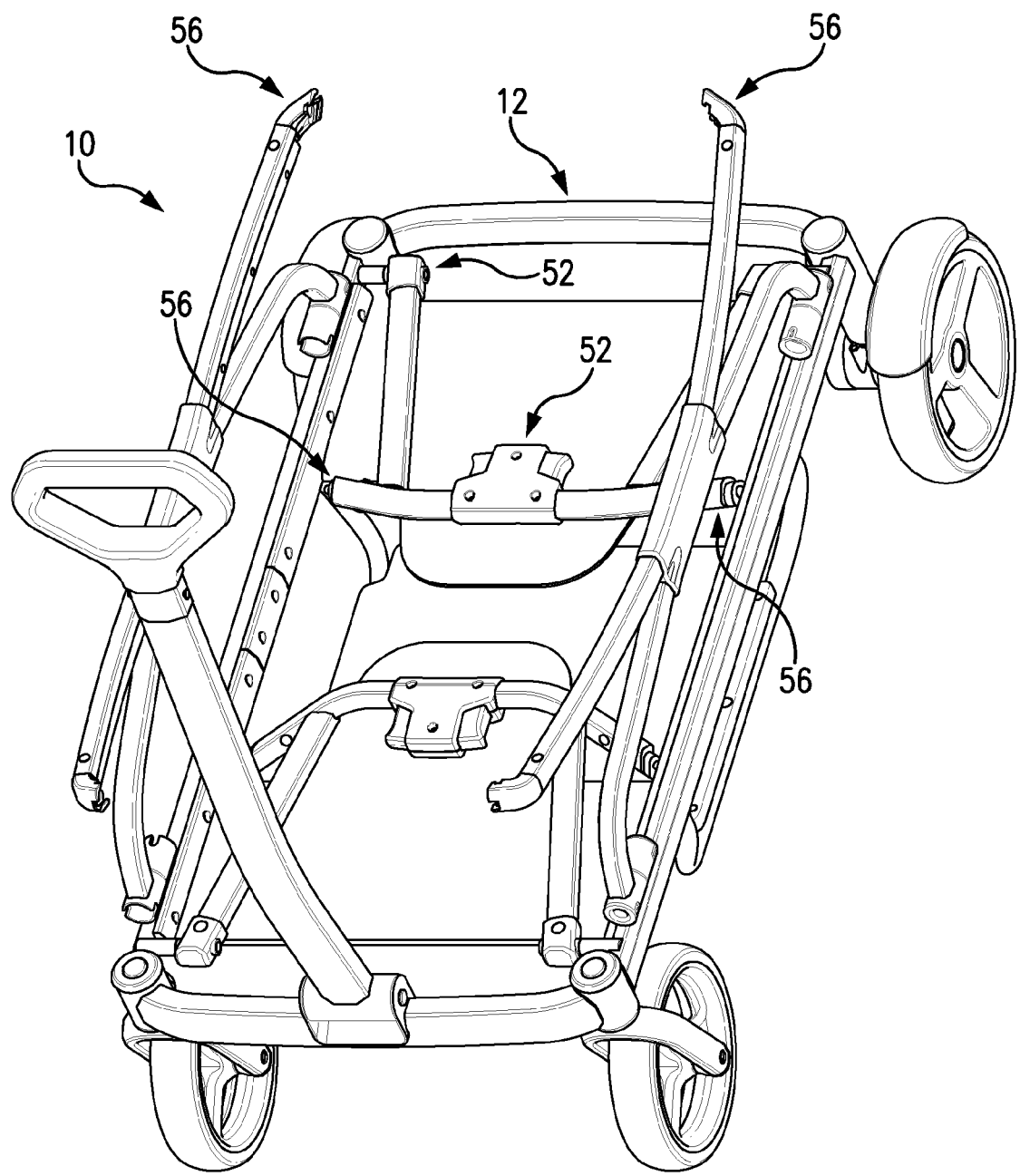
FIG. 9 shows the collapsible wagon of FIG. 8 with its rear endwall folded down during a further step of the collapsing method.

The general operation of the pivotal couplings 50 and 52 and the latch system 54 to reposition the wagon 10 between the unfolded use position and the folded storage position is shown in FIGS. 8-12. With the wagon 10 in the use position of FIG. 1, one of the latch actuators 58 (e.g., the depicted front one) is operated to actuate the respective latches 56 from their locked positions to their unlocked positions in which the respective endwall 16 is released from securement in its use position. Then that endwall 16 is pivoted, about its pivotal coupling 52, downward and inward to its storage position adjacent (against or almost against) the base 12, as shown in FIG. 8. Then the other latch actuator 58 (e.g., the depicted rear one) is operated to actuate its latches 56 from their locked positions to their unlocked positions, and that endwall 16 is then pivoted, about its pivotal coupling 52, downward and inward to its storage position adjacent the base 12, as shown in FIG. 9. Of course, both latch actuators 58 can be operated at the same time and/or both endwalls 16 can be pivoted at the same time, if desired. And of course the sequence can be performed in the opposite order, first releasing the rear endwall then the front one, if desired. In other embodiments, each latch includes a dedicated actuator or all latches are operated by a single actuator.

Figure 10:
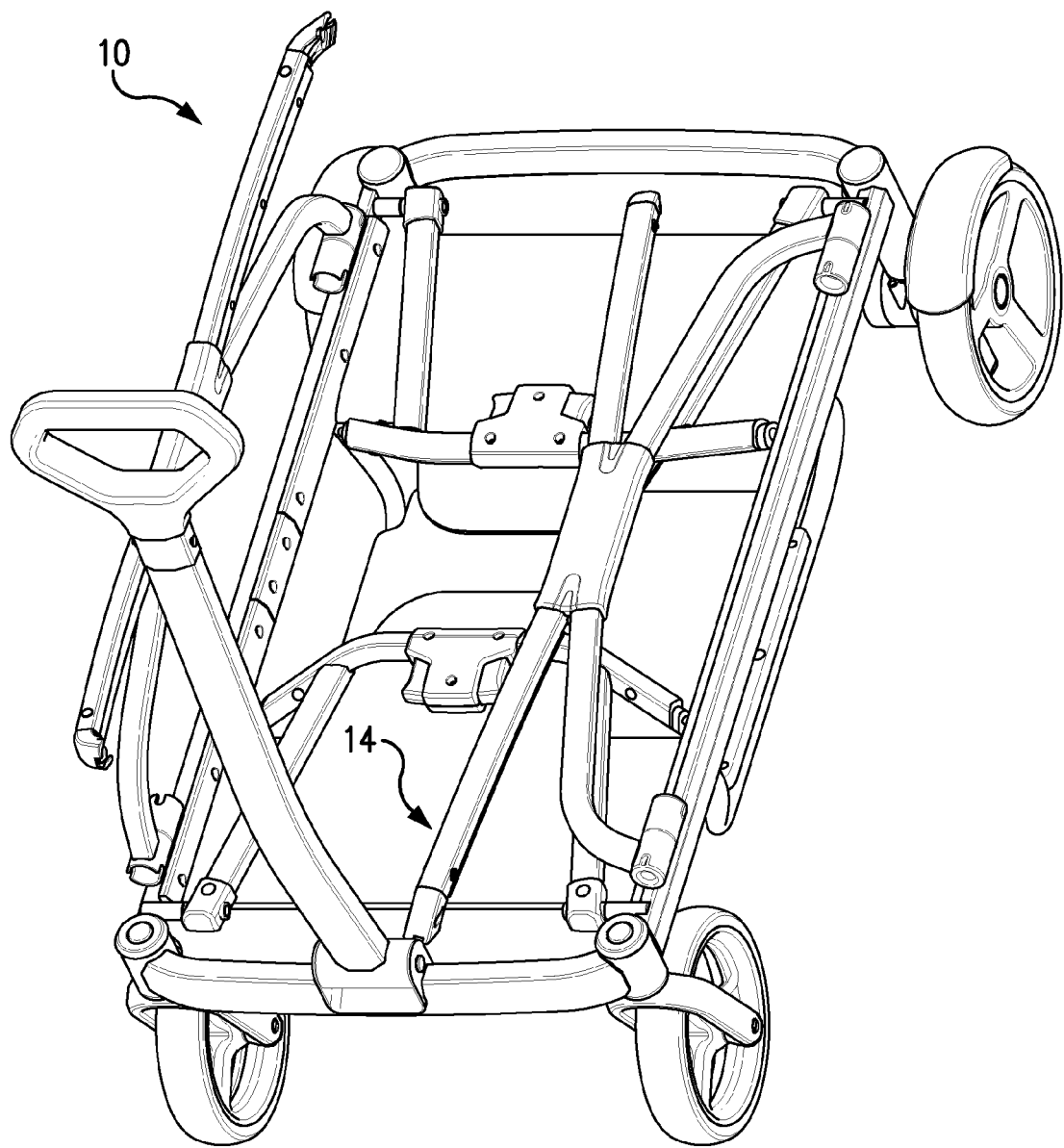
FIG. 10 shows the collapsible wagon of FIG. 9 with its right sidewall folded down during a further step of the collapsing method.
Figure 11:
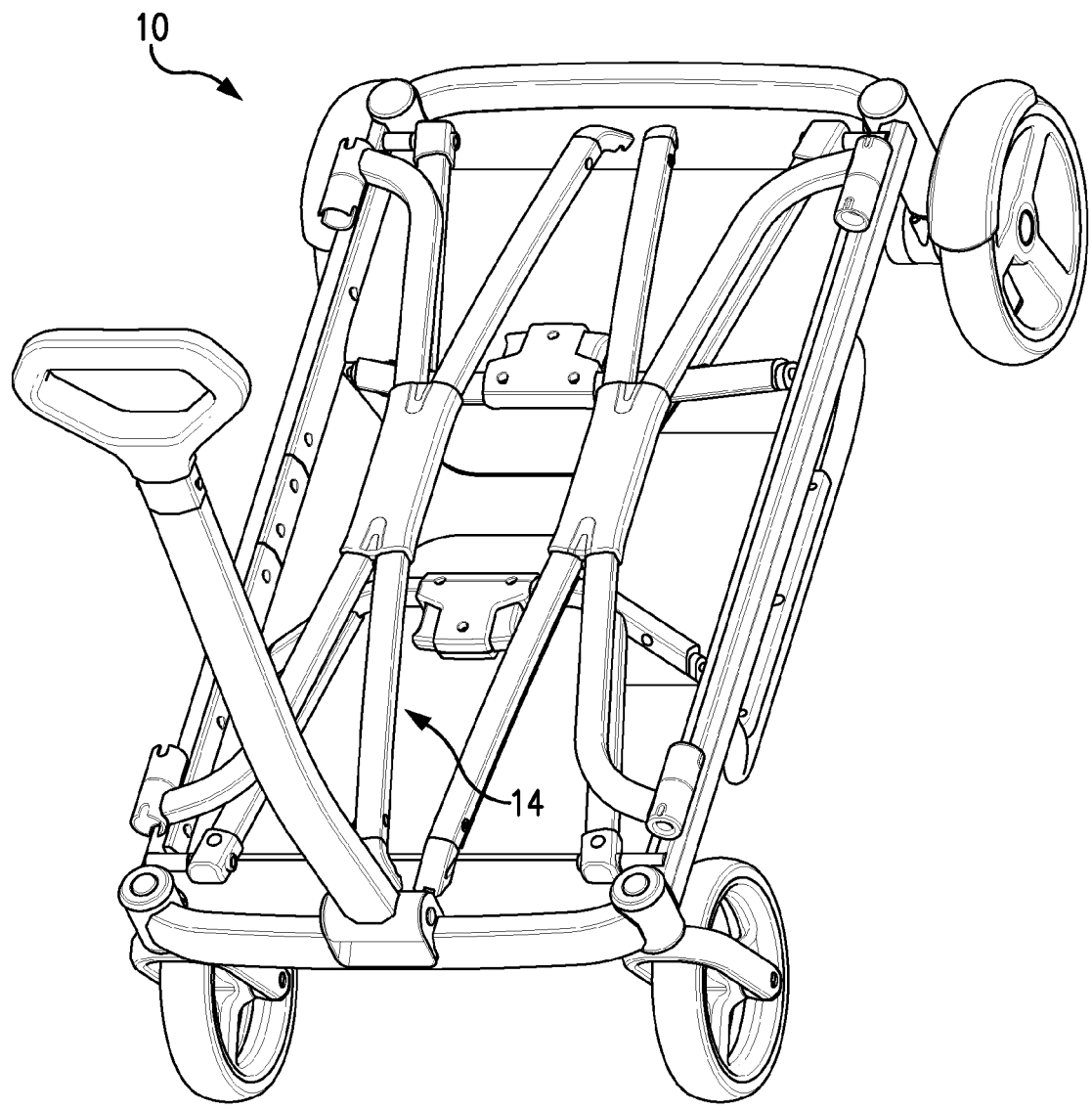
FIG. 11 shows the collapsible wagon of FIG. 10 with its left sidewall folded down during a further step of the collapsing method.

Next, one of the released sidewalls 14 is pivoted, about its pivotal coupling 50, downward and inward to its storage position adjacent the base 12, as shown in FIG. 10. Then the other released sidewalls 14 is pivoted, about its pivotal coupling 50, downward and inward to its storage position adjacent the base 12, as shown in FIG. 11. In the depicted embodiment, the latches 56 releasably secure the sidewalls 14 and the endwalls together in the use position, so operating the latch actuators 58 releases the sidewalls to pivot and not just the endwalls. In other embodiments, the latches secure the sidewalls and the endwalls to the base, so separate actuators are operated to release the sidewalls. And in yet other embodiments, the actuators are mounted on the sidewalls instead of the endwalls, for example at the front or rear ends thereof for ease of joint operation.

Figure 12:
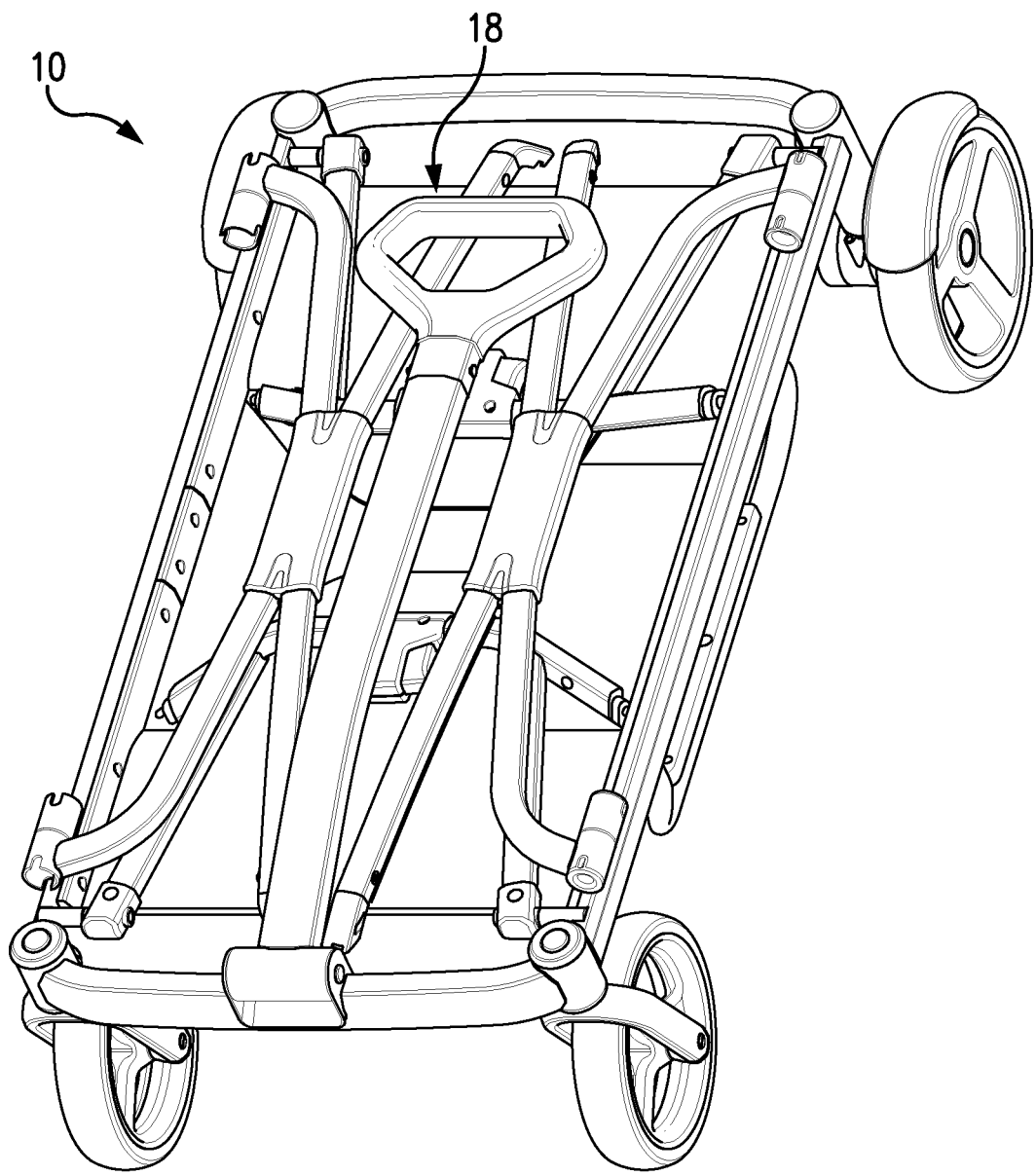
FIG. 12 shows the collapsible wagon of FIG. 10 with its pull handle folded down to complete the collapsing method.
Figure 13:
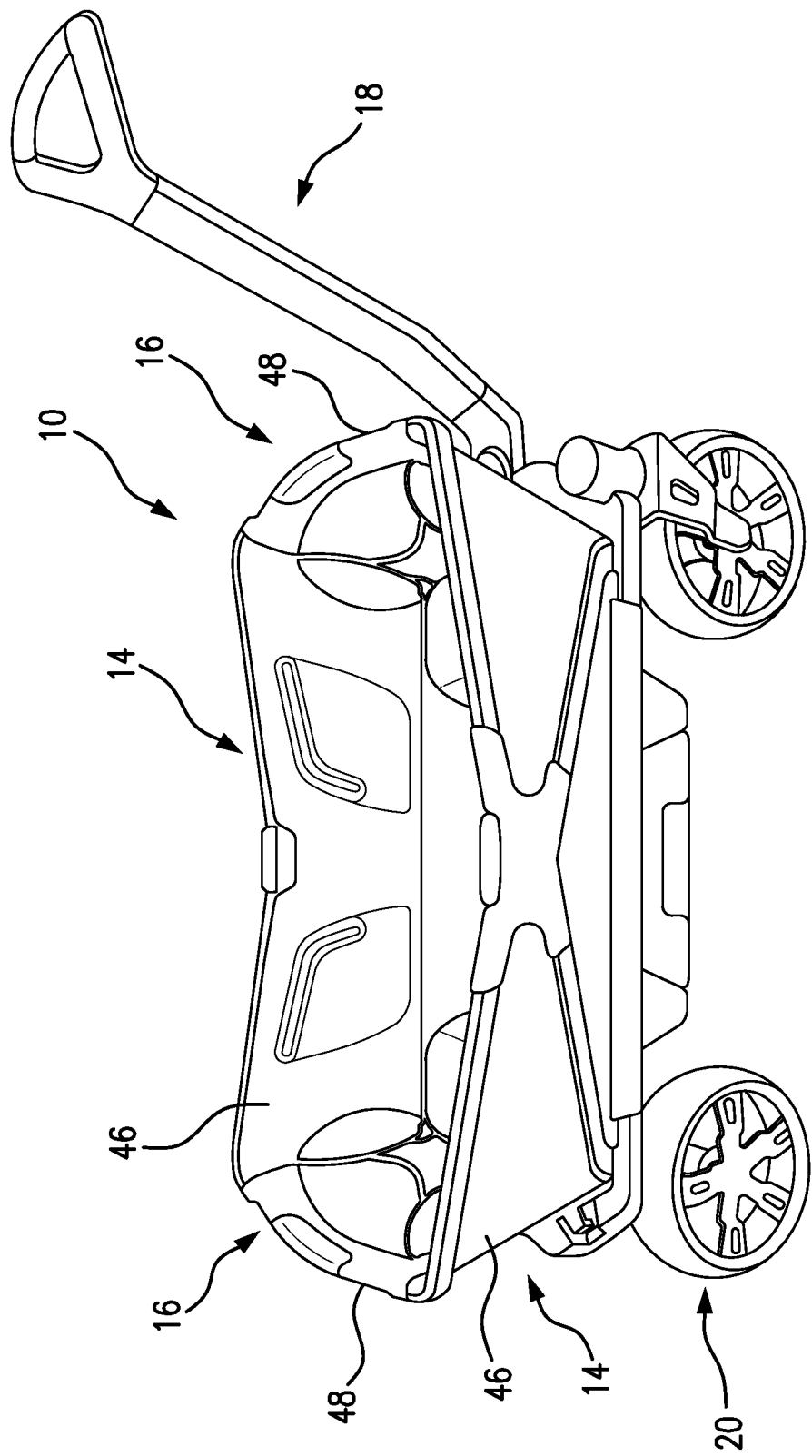
FIG. 13 is a perspective view of the collapsible wagon of FIG. 1, showing covers of its peripheral walls and including minor design variations.
Figure 14:
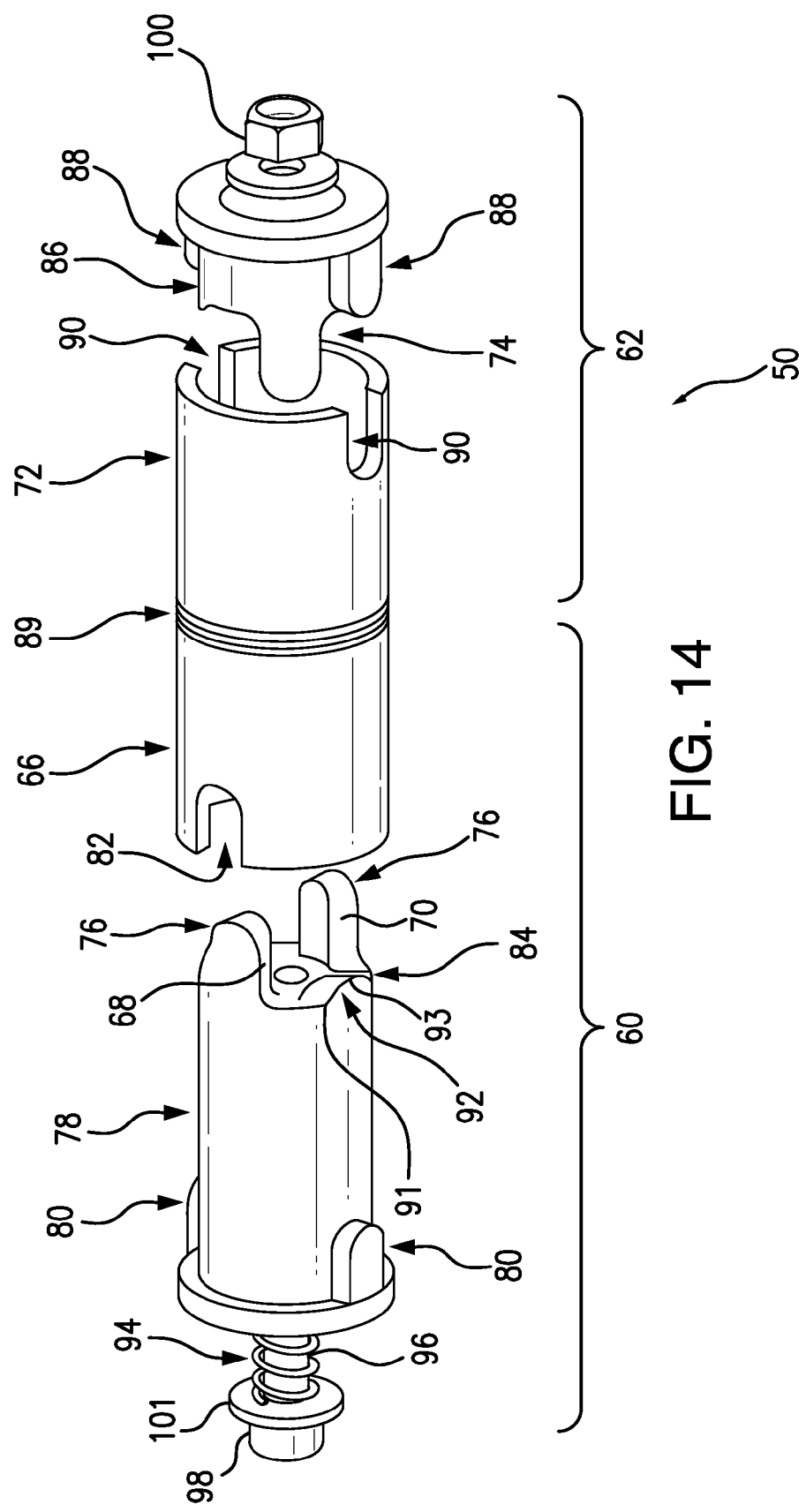
FIG. 14 is a perspective exploded view of a pinchless internal mechanical stop for one of the peripheral walls of the collapsible wagon of FIG. 1.
Figure 15:
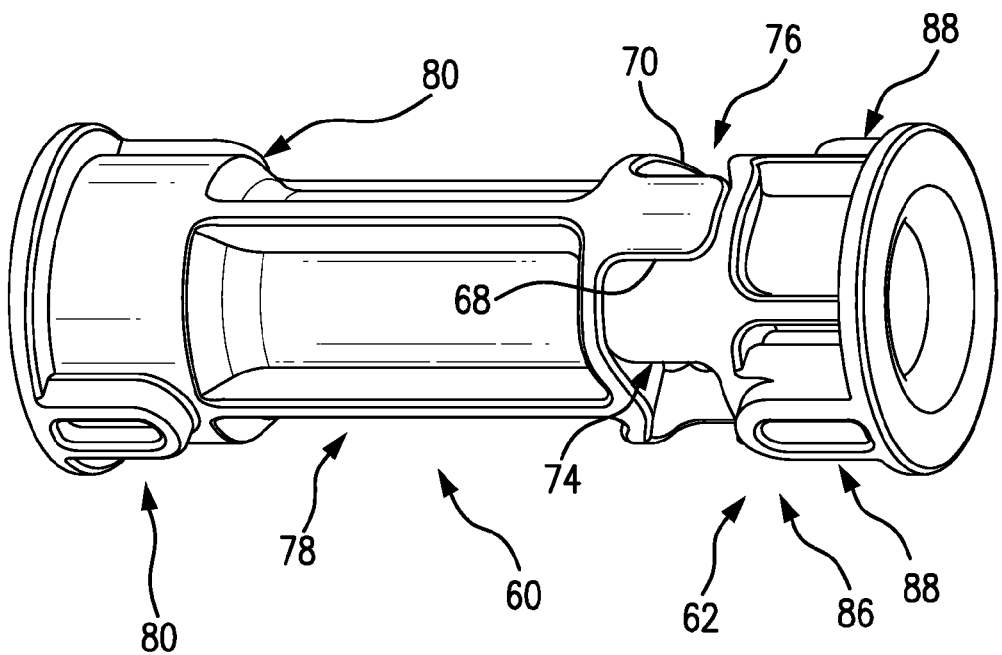
FIG. 15 is a perspective view of a portion of the pinchless internal mechanical stop of FIG. 14, shown in a storage position in which its peripheral wall is in the folded storage position.
Figure 16:
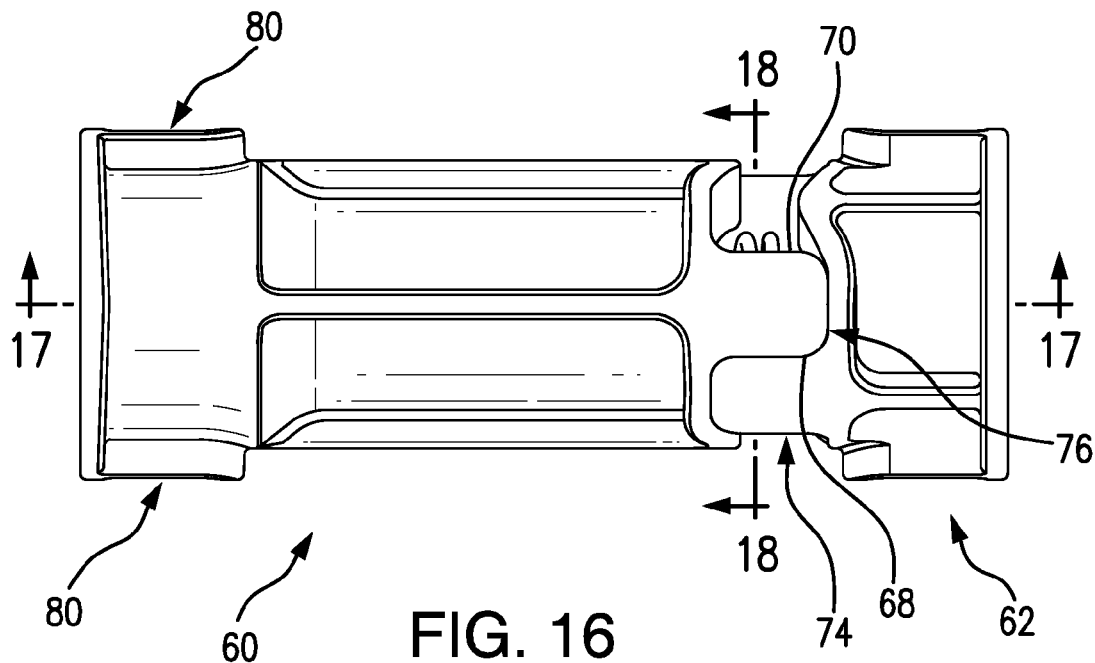
FIG. 16 is a side view of the pinchless stop of FIG. 15.
Figure 17:
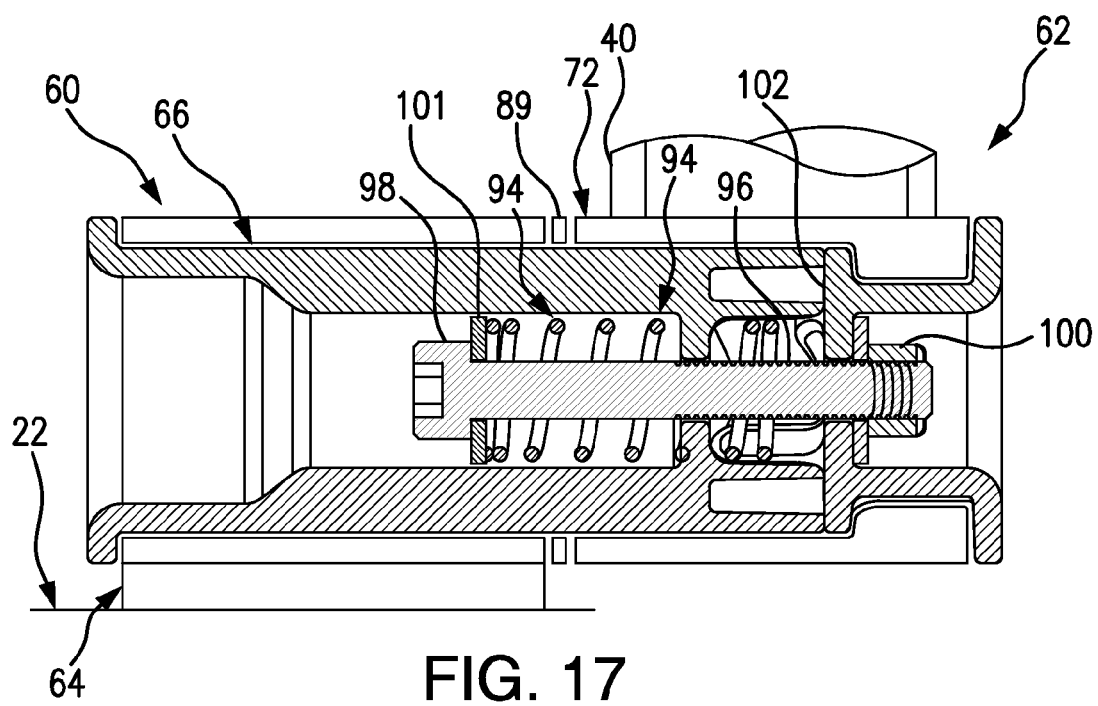
FIG. 17 is a cross-sectional view of the pinchless stop of FIG. 16 taken at line 17-17 thereof and showing its housing.
Figure 18:
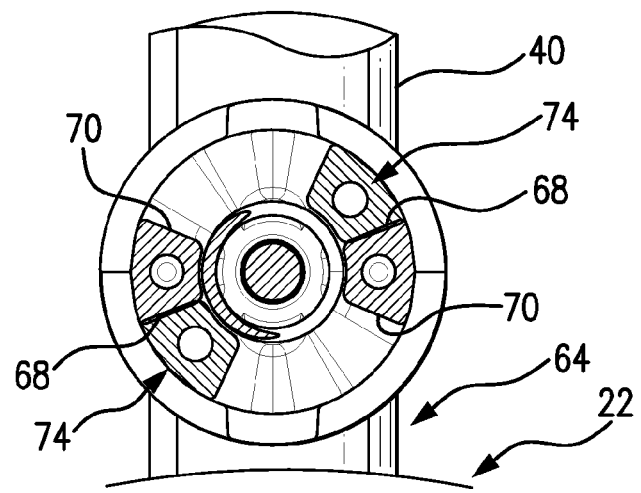
FIG. 18 is a cross-sectional view of the pinchless stop of FIG. 16 taken at line 18-18 thereof and showing its housing.
Figure 19:
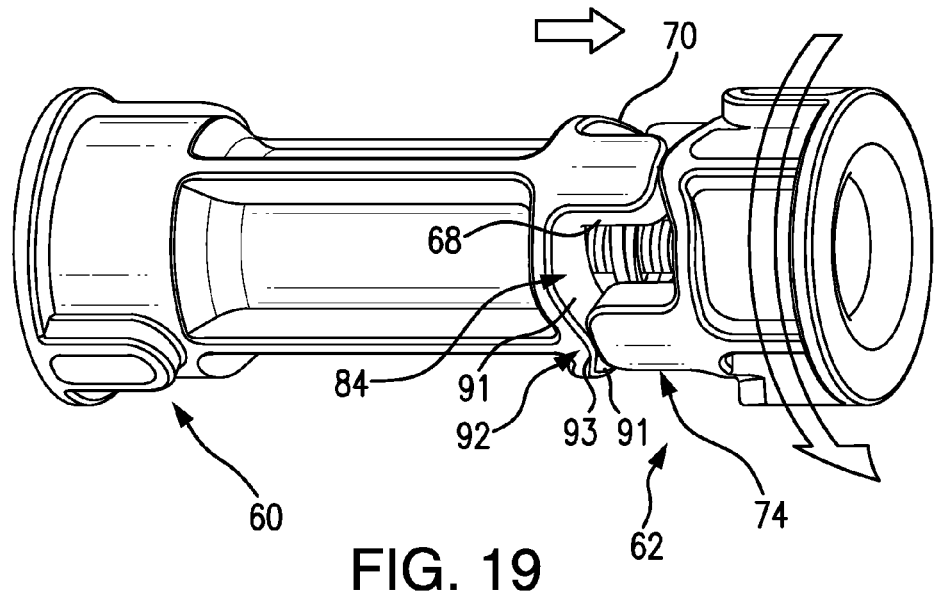
FIG. 19 shows the pinchless stop of FIG. 15 in a tipping position of a rotating motion in which its peripheral wall is being pivoted from the folded storage position to an unfolded use position.
Figure 20:
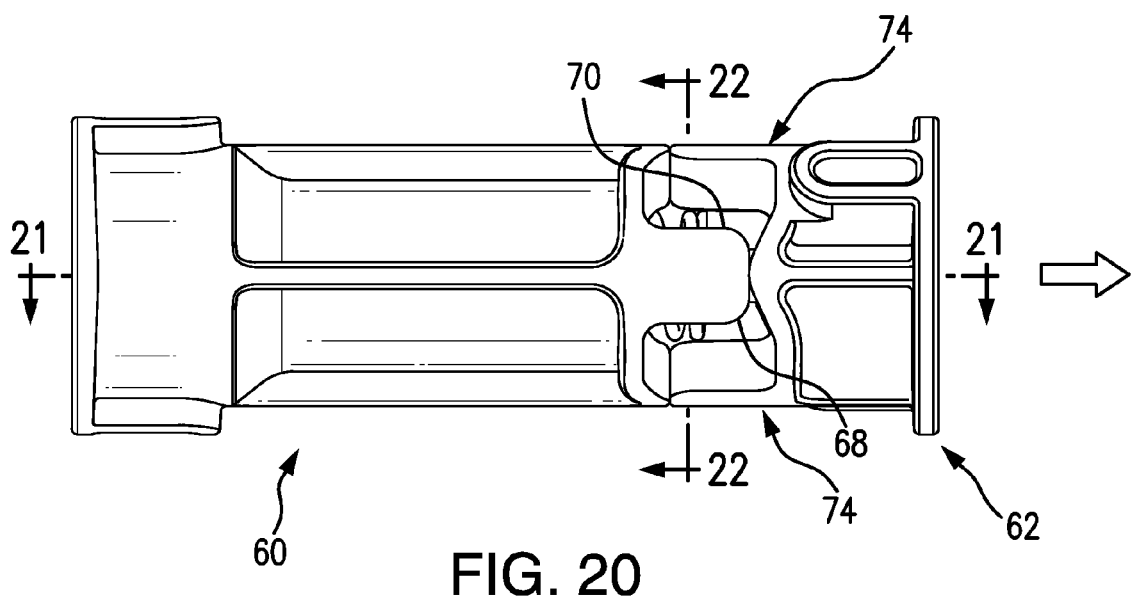
FIG. 20 is a side view of the pinchless stop of FIG. 19.
Figure 21:
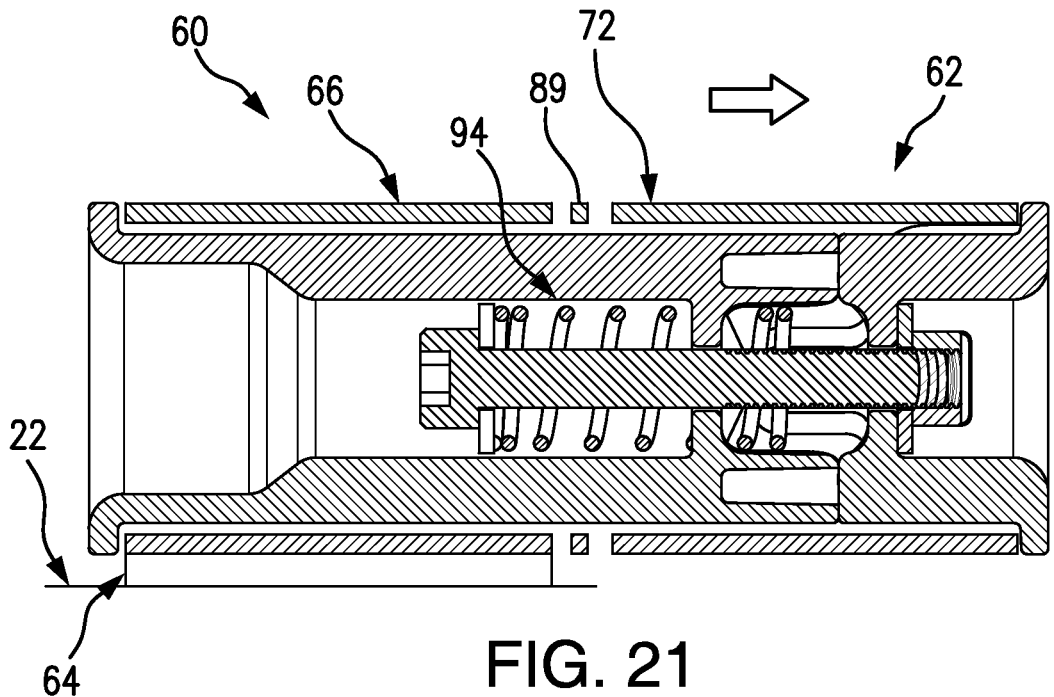
FIG. 21 is a cross-sectional view of the pinchless stop of FIG. 20 taken at line 21-21 thereof and showing its housing.
Figure 22:
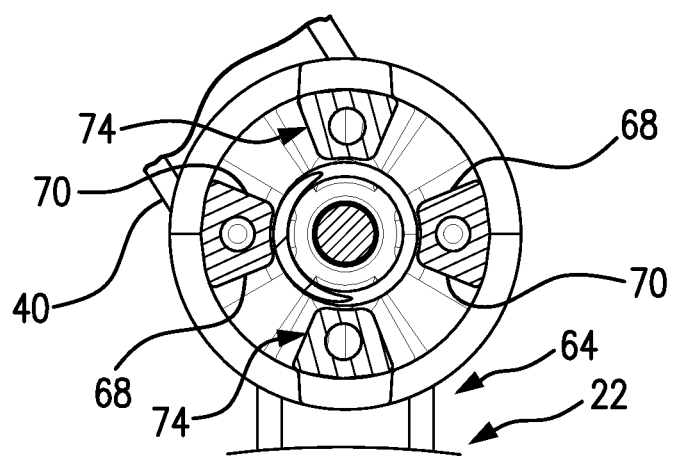
FIG. 22 is a cross-sectional view of the pinchless stop of FIG. 20 taken at line 22-22 thereof and showing its housing.
Figure 23:
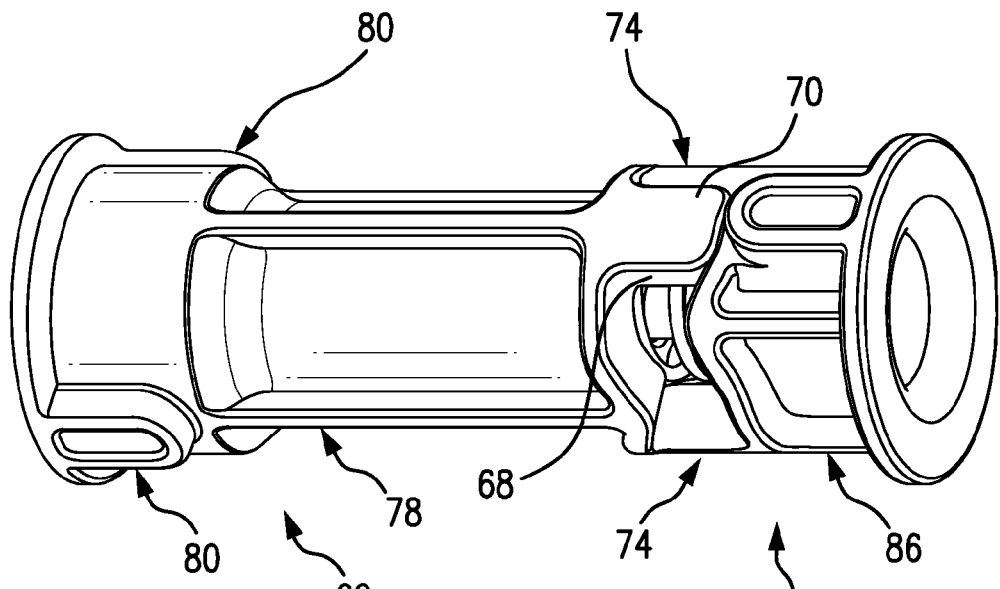
FIG. 23 shows the pinchless stop of FIG. 19 pivoted to a use position in which its peripheral wall has been pivoted to the unfolded use position.
Figure 24:
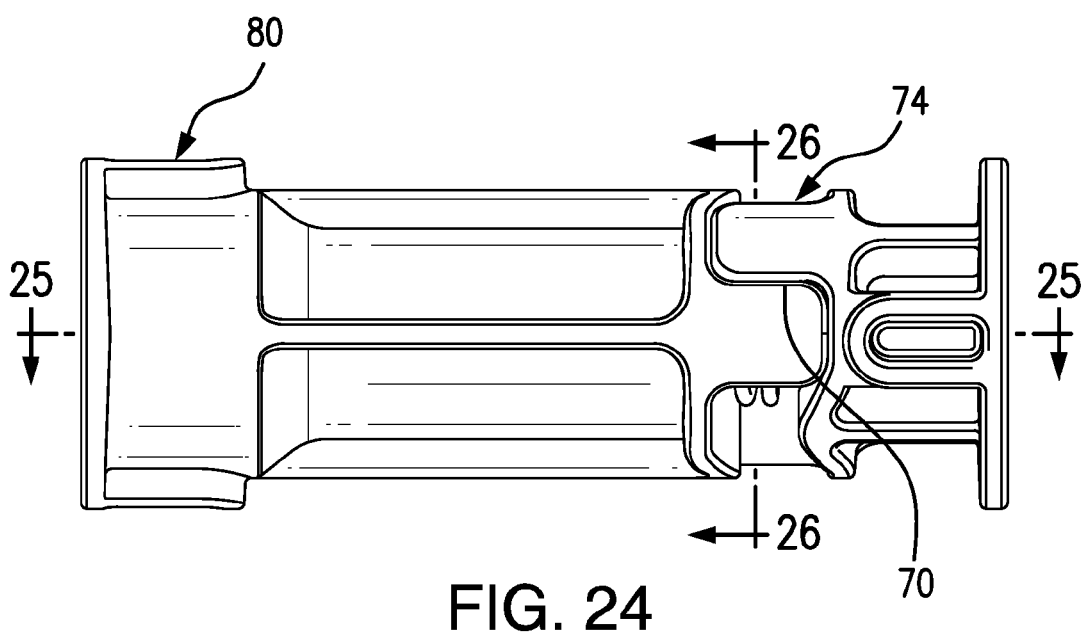
FIG. 24 is a side view of the pinchless stop of FIG. 23.
Figure 25:
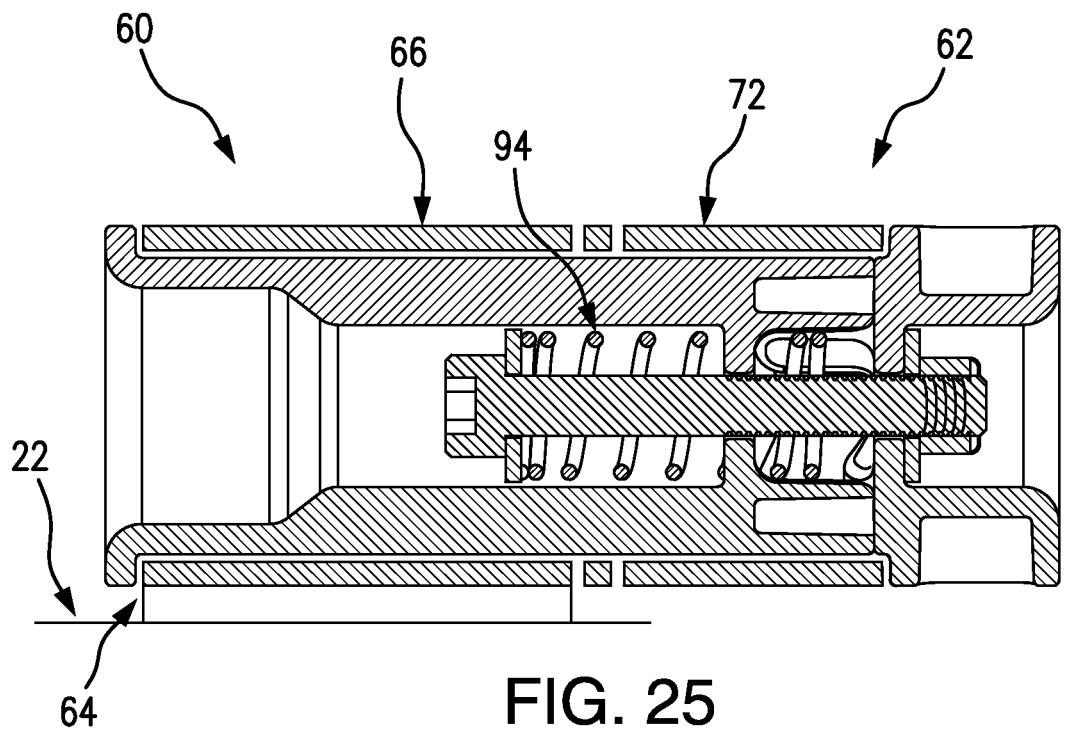
FIG. 25 is a cross-sectional view of the pinchless stop of FIG. 24 taken at line 25-25 thereof and showing its housing.
Figure 26:
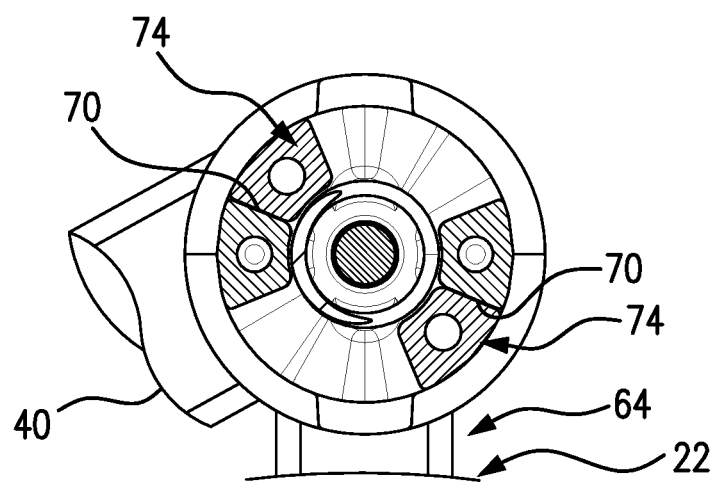
FIG. 26 is a cross-sectional view of the pinchless stop of FIG. 24 taken at line 26-26 thereof and showing its housing.

Finally, the handle 18 is pivoted down to its storage position, as shown in of FIG. 12. The wagon 10 is now in a much more compact arrangement for storage and transport, with its height (excluding the handle) reduced by about half in the embodiment shown. In some embodiments, a handle-storage latch is provided to releasably secure the handle in its storage position, thereby also retaining the endwalls 16 and the sidewalls 14 (underneath the retained handled) in their storage positions. And in some embodiments, the wheels 20 and/or the footrest 26 are removable or foldable relative to the base 12 for further compactness, though details of such features are not provided herein for brevity.

Figure 2:
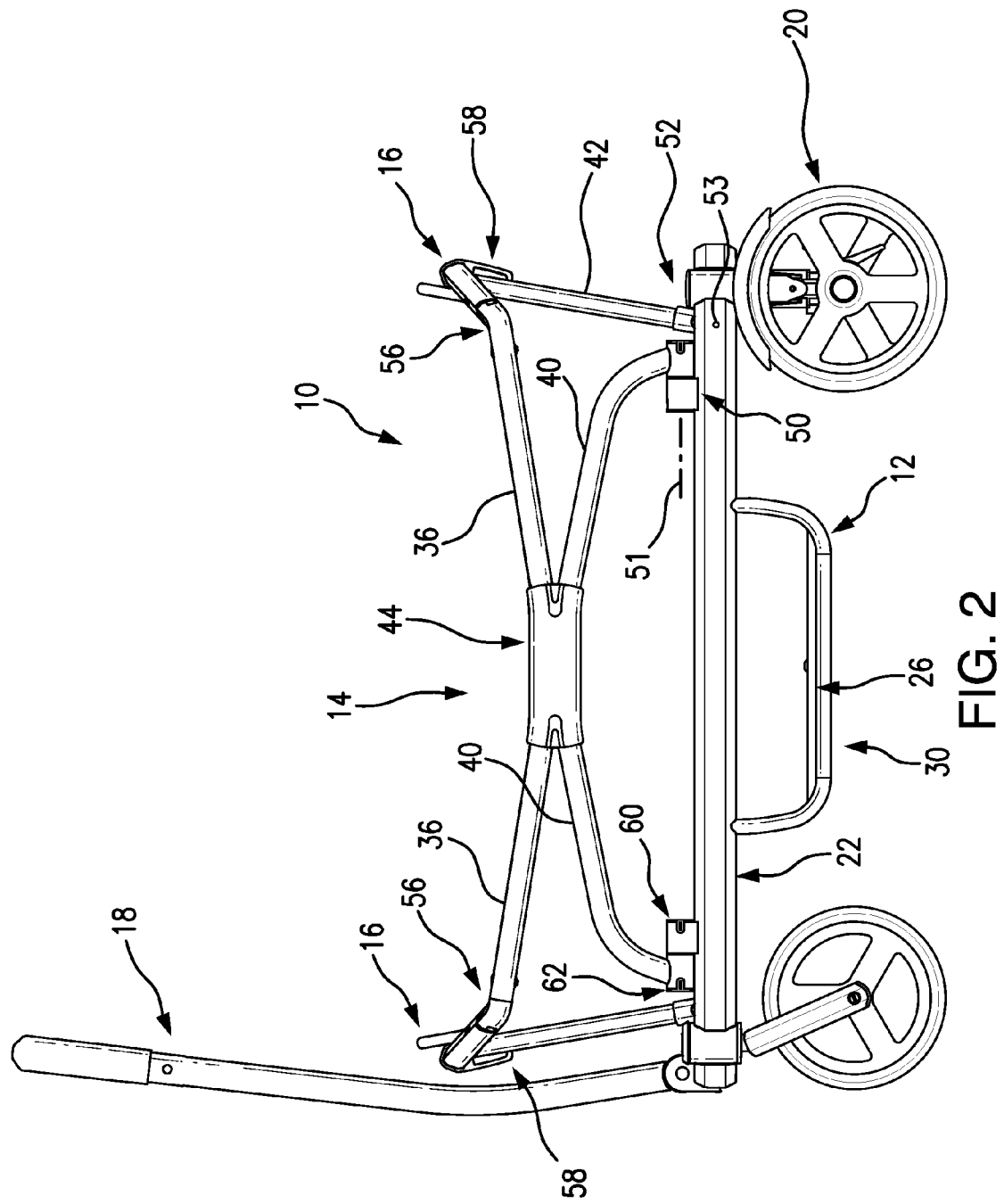
FIG. 2 is a side view of the collapsible wagon of FIG. 1.
Figure 3:
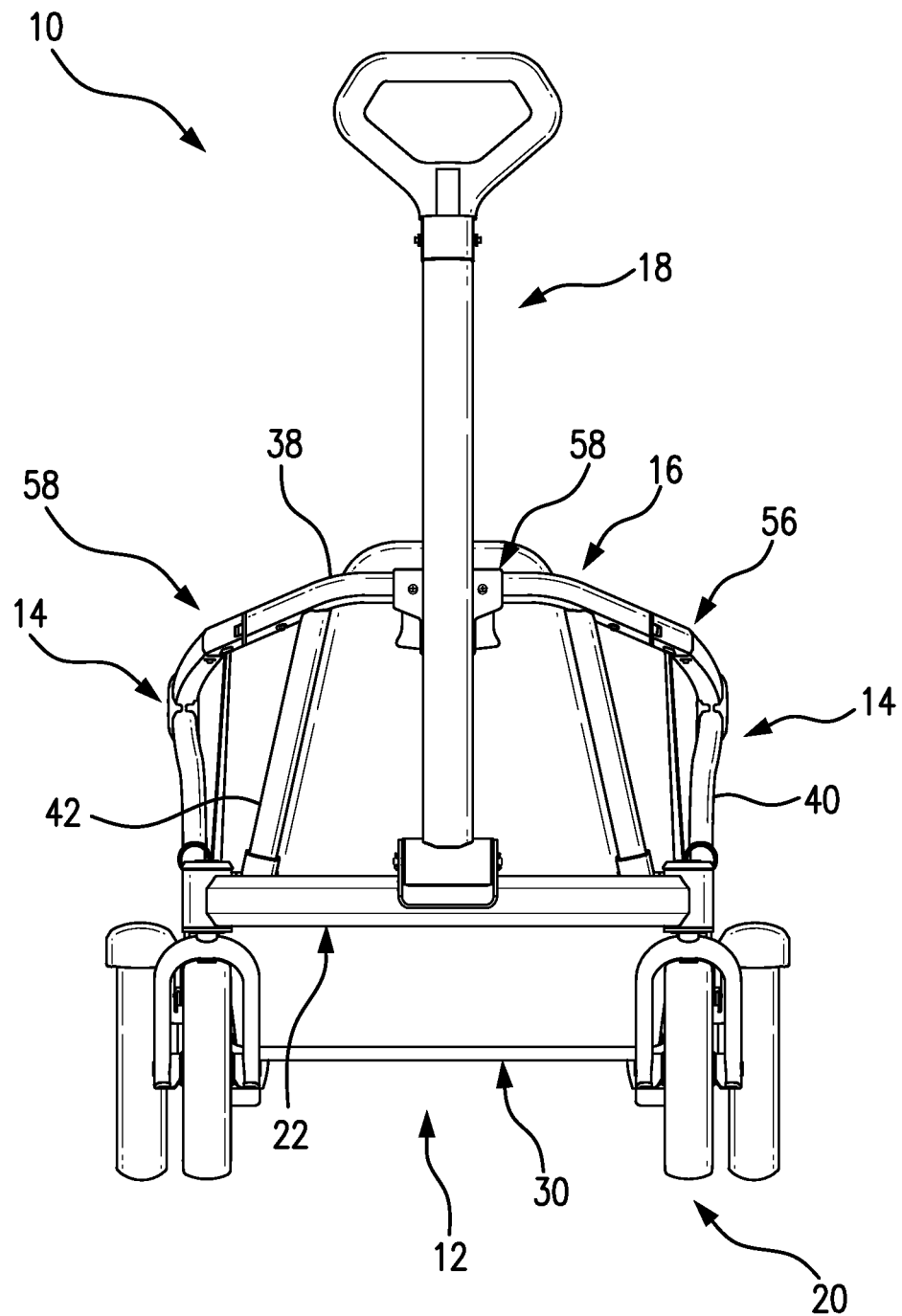
FIG. 3 is a front view of the collapsible wagon of FIG. 2.
Figure 4:
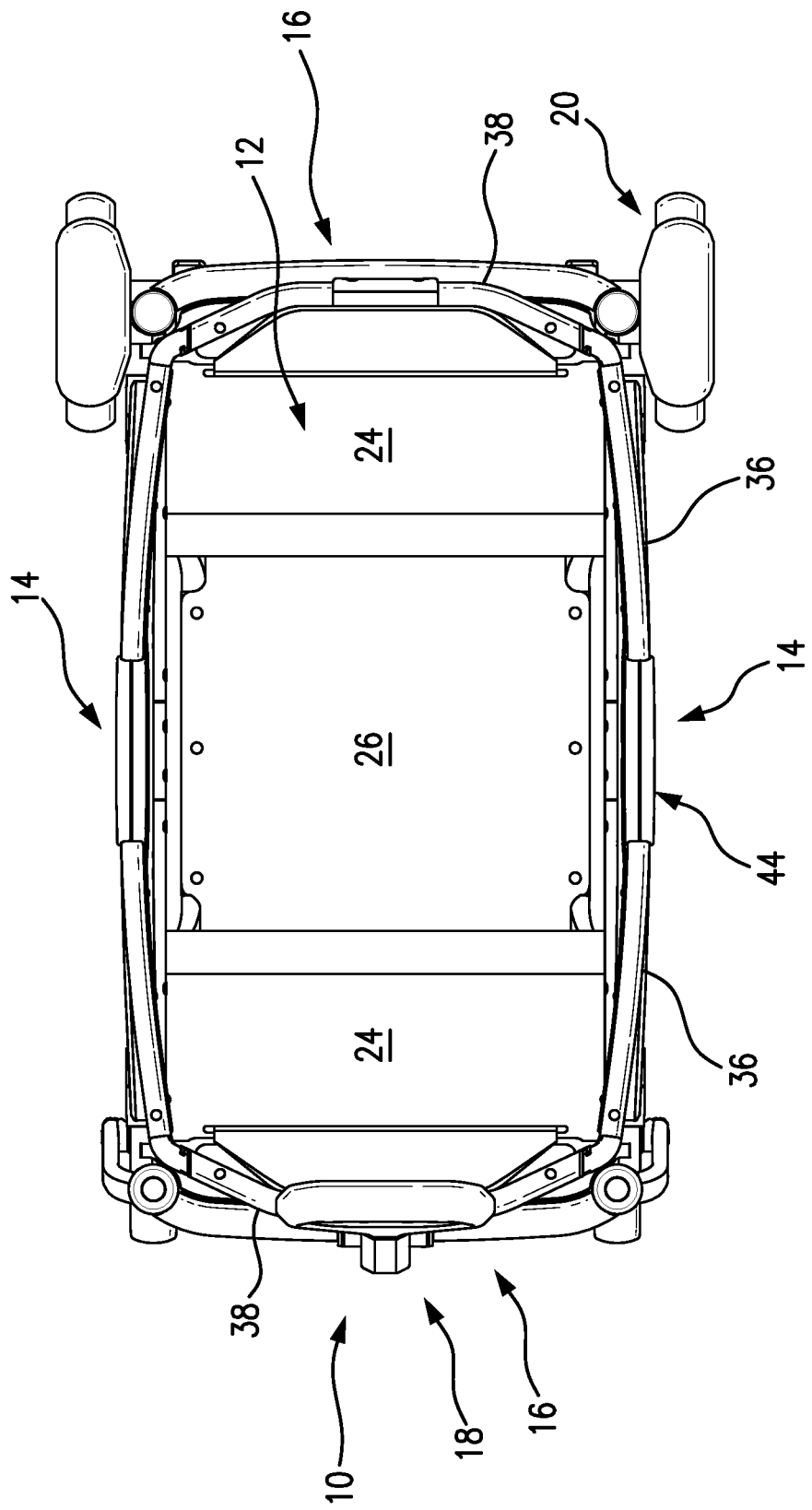
FIG. 4 is a top view of the collapsible wagon of FIG. 2.
Figure 5:
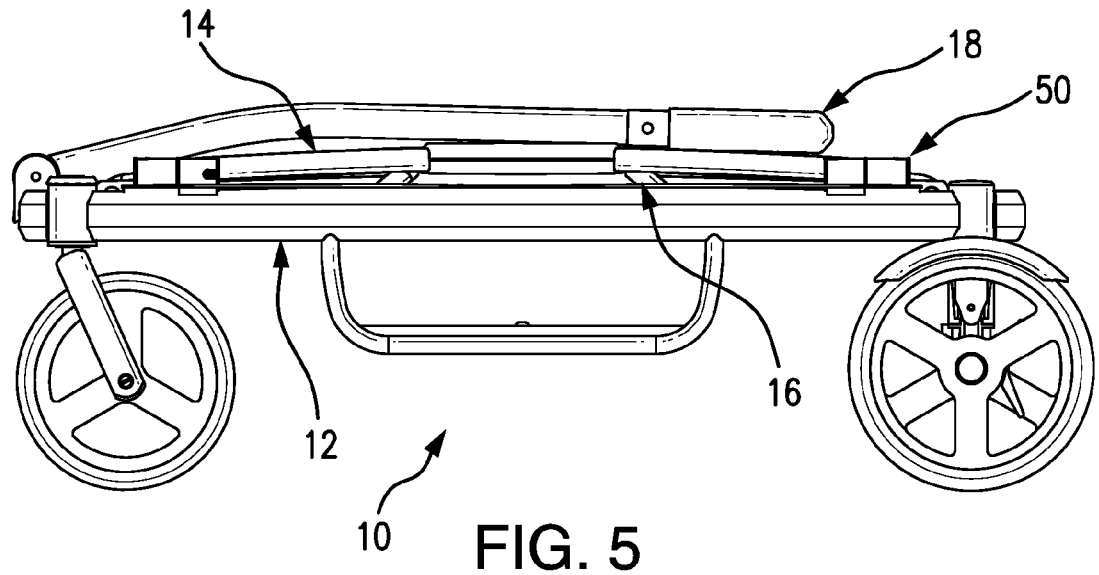
FIG. 5 shows the collapsible wagon of FIG. 2 with its peripheral sidewalls and endwalls as well as its pull handle in a folded position for storage and transport.
Figure 6:
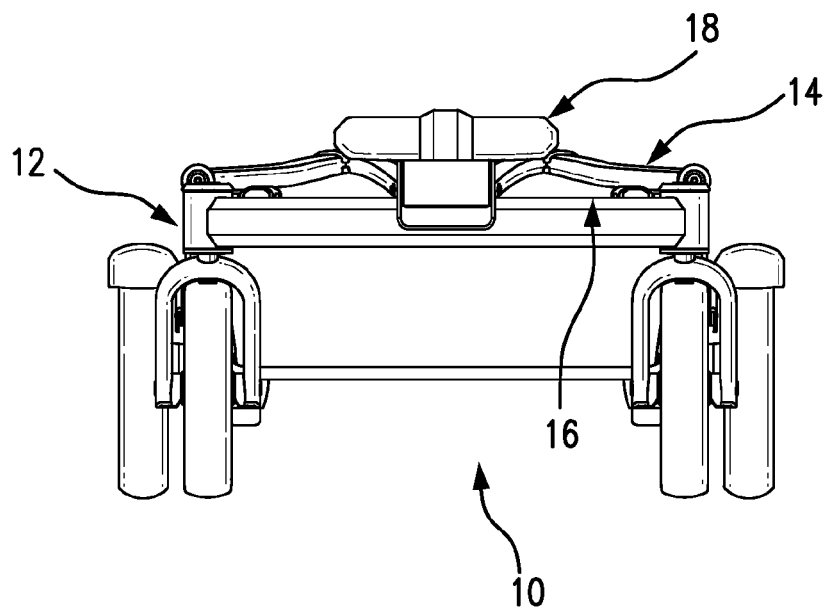
FIG. 6 is a front view of the collapsible wagon of FIG. 5.
Figure 7:
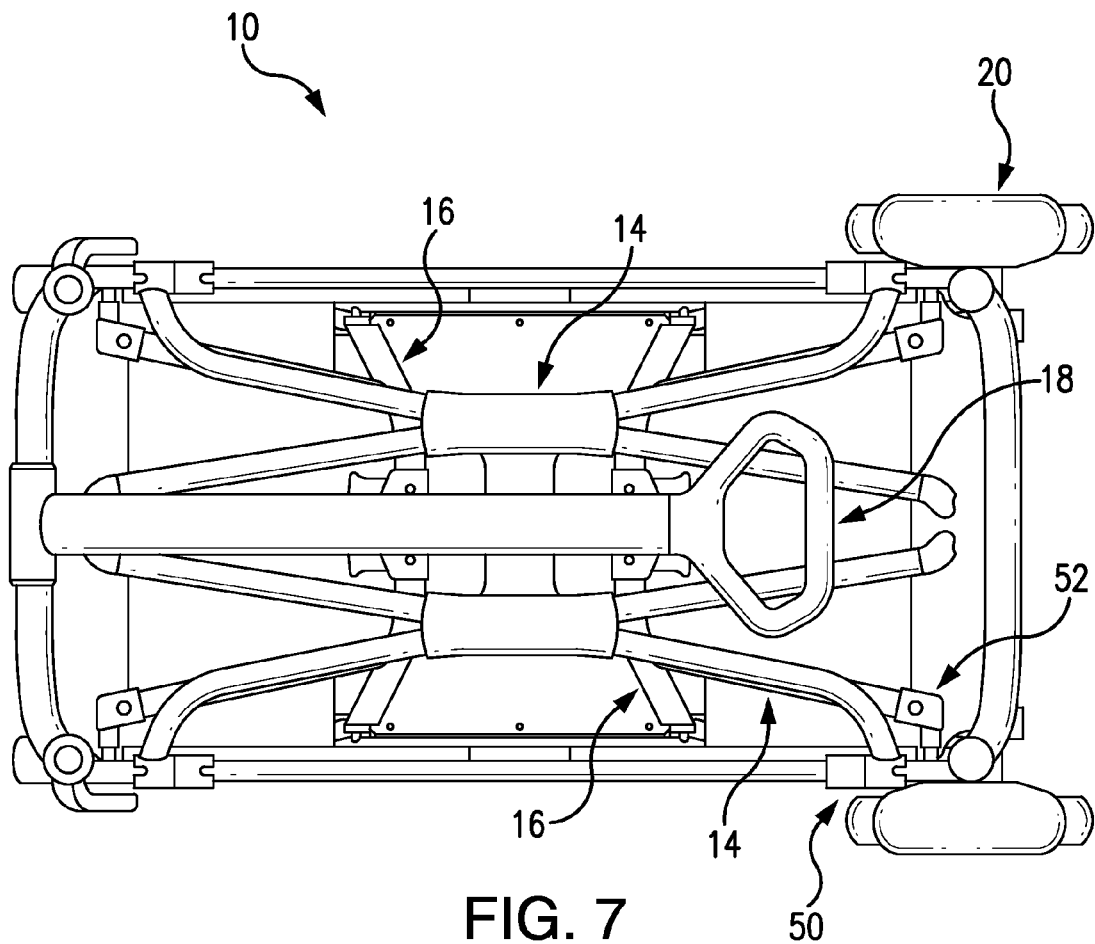
FIG. 7 is a top view of the collapsible wagon of FIG. 5.

It should be noted that in the depicted embodiment the endwall pivotal couplings 152 have pivot axes 153 positioned lower than (e.g., subjacent) pivot axes 151 of the sidewall pivotal couplings 150 (see FIGS. 1-2). This enables the endwalls 16 to be folded down generally flat and the sidewalls 14 to then be folded down on top of them and still be arranged generally flat for a compact configuration in the storage position (see FIGS. 5-6). In other embodiments, this is reversed, with the sidewall pivots lower than the endwall pivots so the endwalls can fold generally flat over the sidewalls.

Referring additionally to FIGS. 14-26, details of the pivotal couplings 50 of the depicted embodiment will now be provided. The pivotal couplings 50 are innovative in that they provide for "pinchless" pivoting of the sidewalls 14 relative to the base 12 by eliminating pinch points where fingers can be pinched between mechanical stops during folding and unfolding of the sidewalls. In some embodiments, this same pinchless design is used for the pivotal couplings 52 for mounting the endwalls 16 to the base 12, additionally or alternatively to its use for the sidewalls 14. Typically, two of the pivotal couplings 50 and 52 are provided for each corresponding peripheral wall 14/16, though more or fewer can be used as may be desired.

The pivotal couplings 50 each include an anchor 60 and a pivot 62 that pivots relative to the anchor. The anchor 60 is fixedly mounted to the base 12, for example it can be mounted to the base frame member 22 by a bracket 64, as depicted, or it can be mounted by a weld, a strap, bolts, pins, or another conventional mounting or fastener. The pivot 62 is fixedly mounted to the respective sidewall 14, for example it can be mounted to the sidewall connecting frame member 40 by a weld, as depicted, or it can be mounted by a strap, a bracket, bolts, pins, or another conventional mounting or fastener.

The anchor 60 includes a fixed housing 66 that internally contains two fixed stop surfaces 68 and 70, and the pivot 62 includes a rotary housing 72 that internally contains a rotary stop member 74. The two fixed stop surfaces 68 and 70 correspond to the storage and use positions, respectively, with the rotary stop member 74 positioned between them and pivotable through an angular motion limited by them. Thus, the pivot 62 rotates relative to the anchor 60 in one angular direction to a storage position (in which the respective sidewall 14 is folded into its storage position) defined by, and with further travel in that direction limited by, abutting contact of the rotary stop member 74 against the storage fixed stop surface 68 (see FIGS. 15-18). And the pivot 62 rotates relative to the anchor assembly 60 in the opposite angular direction to a use position (in which the respective sidewall 14 is unfolded into its use position) defined by, and with further travel in that direction limited by, abutting contact of the rotary stop member 74 against the use fixed stop surface 70 (see FIGS. 23-26). It will be understood that in the present context rotating and pivoting are considered to be synonymous.

In the depicted embodiment, the fixed housing 66 and the fixed stop surfaces 68 and 70 of the anchor 60 are provided as two parts that are assembled together so that they do not pivot relative to each other. For example, the fixed stop surfaces 68 and 70 can be defined by two protrusions 76 extending axially from a cylindrical fixed body 78, and the fixed housing 66 can be in the form of a cylindrical shell, with the cylindrical fixed body and the fixed housing having interengaging male parts (e.g., fingers, ribs, or bosses) 80 and female parts (e.g., grooves, channels, or holes) 82 that prevent rotation between them. In addition, the anchor 60 can include two sets of the fixed stop surfaces 68 and 70 defined by opposite sides faces of the two protrusions 76, as depicted. In other embodiments, these parts are integrally formed as a single part, or more, fewer, or differently configured sets of fixed stop surfaces are provided (e.g., each storage stop surface can be formed by a dedicated storage protrusion and each use stop surface can be formed by a dedicated use protrusion, or only one set of stop surfaces is provided). In any design, the fixed stop surfaces 68 and 70 are internally contained within the fixed housing 66 (or alternatively the rotary housing 72).

Similarly, in the depicted embodiment the rotary housing 72 and the rotary stop member 74 of the pivot 62 are provided as two parts that are assembled together so that they do not pivot relative to each other. For example, the rotary stop member 74 can be in the form of at least one protrusion that extends axially from a cylindrical rotary body 86 and that defines oppositely facing storage and use contact surfaces, and the rotary housing 72 can be in the form of a cylindrical shell, with the cylindrical rotary body and the rotary housing having interengaging male parts (e.g., fingers, ribs, or bosses) 88 and female parts (e.g., grooves, channels, or holes) 90 that prevent rotation between the parts. In addition, the pivot 62 can include two of the rotary stop members 74, positioned oppositely (e.g., 180 degrees apart around the circumference of the pivot body 86), with each contacting a respective set of the fixed stop surfaces 68 and 70 to mechanically limiting rotation, as depicted. In other embodiments, these parts are integrally formed as a single part, or more, fewer, or differently configured rotary stop members are provided (e.g., a storage stop member contacts the storage stop surface and a separate use stop member contacts the use stop surface, or only one stop member is provided). In any design, the rotary stop members 74 are internally contained within the rotary housing 72 (or alternatively the fixed housing 66).

In other embodiments, the stop-surface sets are provided on the pivot and the stop members are provided on the anchor in a vice versa arrangement. In such embodiments, the stop member(s) and the stop-surface set(s) (which can be collectively referred to as "stop elements") are nevertheless internally contained within respective housings.

In addition, the pivotal coupling 50 can optionally include an auto-positioning feature that biases the pivot 62 (and thus its endwall 14) relative to the anchor 60 (and thus the base 12) toward either the use position or the storage position. In typical embodiments, this functionality is built into the pivotal couplings 50, though in other embodiments it can be provided as a stand-alone assembly or incorporated into another assembly of the wagon 10. In the depicted embodiment, for example, the auto-positioning feature includes at least one cam surface 84 that extends between one set of storage and use stop surfaces 68 and 70, that is contacted and guided by a respective stop member 74, and that includes a peaked mid-section 92 with a tipping point 93 between two ramps 91 sloping down and away from the tipping point. And the auto-positioning feature further includes at least spring element 94 that biases the stop members 74 against the respective cam surfaces 84 (or vice versa) for guidance by them.

To effect this, an axle 96 can be provided extending between and mounted to the anchor 60 and the pivot 62 so as to not unduly restrict rotational movement between the parts. For example, the axle 96 can be mounted to the anchor 60 by the depicted conventional fastener 98 and mounted to the pivot 62 by the depicted conventional fastener 100, with the pivot no more than negligibly restricted by friction from rotation relative to the anchor. In addition, bearing surfaces can be provided at the anchor and pivot ends of the positioning spring 94, such as by the depicted anchor flange 101 (e.g., a washer on the anchor-end of the axle 96) and the pivot body endwall 102. And the positioning spring 94 can be provided by the depicted tension coil spring positioned about the pivot axle 96 or by another conventional spring (e.g., a torsion, compression, or leaf spring, or another resiliently deformable element) mounted in another manner. In embodiments without the auto-positioning feature, the same or a similar pivot axis is included to provide the pivotal motion of the pivot relative to the anchor.

In addition, a spacer 89 can be provided axially between the housings 66 and 72, with the anchor and pivot bodies 78 and 86 extending through a bore thereof. The spacer 89 can be in the form of an annular washer for avoiding binding between the housings 66 and 72 and for partially filling the slightly-enlarged gap between the housings caused by their relative axial movement as the pivot is rotated relative to the anchor toward the tipping position.

In use, one of the sidewalls 14 is initially in its storage position (see FIG. 12) with its pivotal coupling 50 in its storage position (see FIGS. 15-18), with the rotary stop members 74 abutting against the respective storage stop surfaces 68. Then the sidewall 14 is lifted and thereby pivoted toward its use position (see FIG. 1), causing the stop members 74 of its pivotal coupling 50 to rotate (as indicated by the angular arrows of FIGS. 19 and 22) toward the use stop surfaces 70 (see FIGS. 19-22). This causes the stop members 74 to ride along the cam surface 84 up (relatively speaking, not necessarily vertically upward) one of the ramps 91 toward the tipping point 93 of the peaked mid-section 92, which causes the pivot 62 to axially move (as indicated by the linear arrows of FIGS. 19-21) away from the anchor 60 a relatively small length (e.g., typically about ¹⁄₁₆ inch to about ⅛ inch), which elongation in turn charges the positioning spring 94. If the sidewall 14 is released before reaching the tipping point 93, the positioning spring 94 will discharge to bias and drive the stop members 74 back down the ramps 91 toward the storage stop surfaces 68.

If the sidewall 14 is further pivoted, the pivotal coupling 50 will reach the tipping position defined by FIGS. 19-22, with the stop members 74 at the tipping point 93 of the peaked midsection 92. If the sidewall 14 is pivoted past the tipping position, the positioning spring 94 will discharge to bias and drive the stop members 74 down (relatively speaking, not necessarily vertically downward) the opposite ramps 91 toward the use stop surfaces 70. Then the sidewall 14 can be released and it will pivot further (under the discharging force of the positioning spring 94) toward or until it reaches the use position with the stop members 74 abutting the use stop surfaces 70 (see FIGS. 23-26). Or the sidewall 14 can be manually pivoted further to the use position.

After use when it is desired to return the sidewall 14 to its storage position, the process steps can simply be reversed, thereby returning the stop members 74 into contact with the storage stop surfaces 70. The ramps 91 are typically generally symmetrical to provide the same auto-positioning functionality when folding or unfolding the sidewalls 14. In this way, the auto-positioning elements function to induce the sidewall 14 to "spring" toward, and thereby biasingly retain the sidewall in, the storage or use position under the force of the positioning spring 94, without the need for a blocking-type lock or latch for the storage position.

Because the stop surfaces 68 and 70 and the stop members 74 are all contained within their respective housings 66 and 72 (both axially and transversely), there are no exposed gaps between them that get closed in a pinching manner when folding and unfolding the wagon 10. In this way, even the small fingers of children do not get caught between pivoting parts and pinched, resulting in a design that is safer for children as well as adults.

Referring additionally to FIGS. 27-34, details of the latch system 54 of the depicted embodiment will now be provided. The latch system 54 is innovative in that it provides for quickly and easily releasing the peripheral walls 14/16 for folding to the storage position and it provides for robustness and minimized loose play when the peripheral walls are secured in the use position. In some embodiments, the basic latch design is used without also including the minimized-play design. And in other embodiments, the minimized-play design is included with a different latch design.

Figure 27:
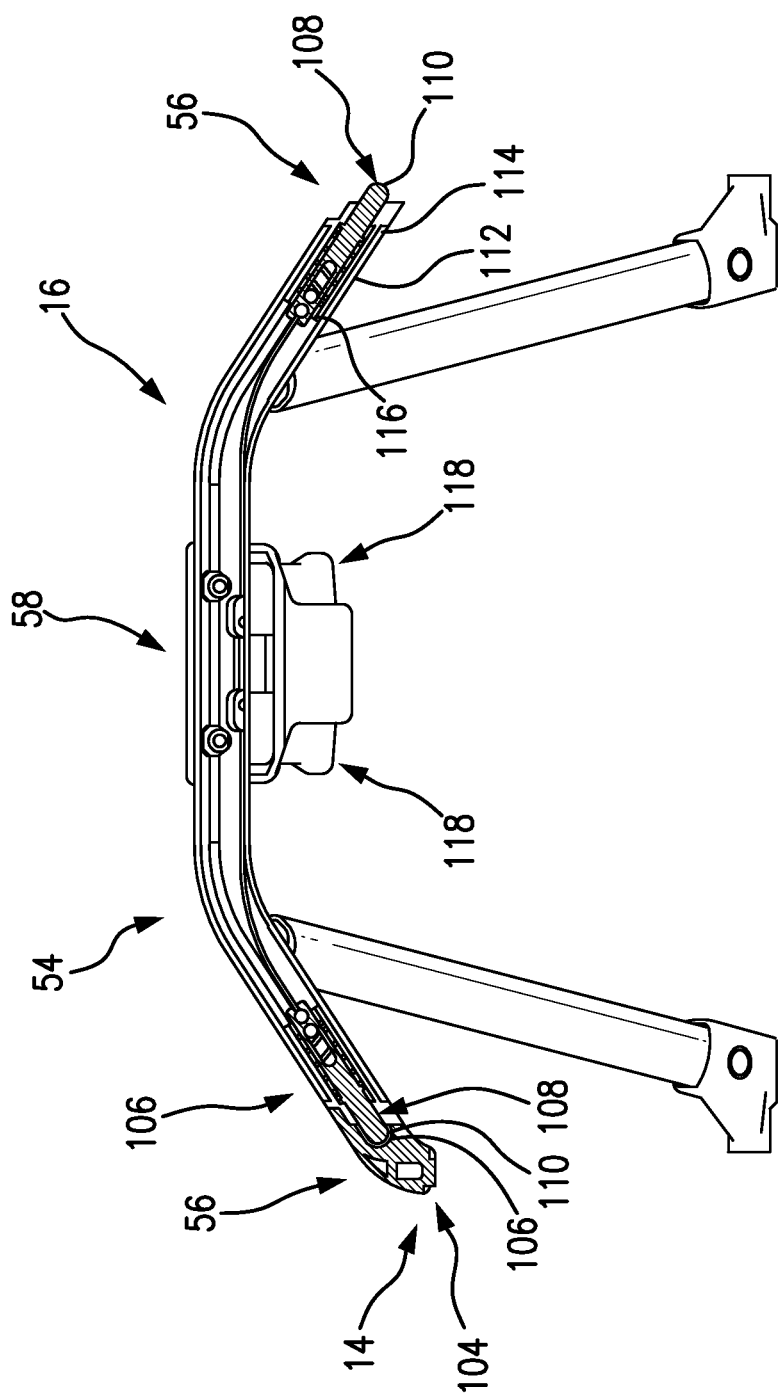
FIG. 27 is a cross-sectional view of a latch system for releasably securing the peripheral walls of the collapsible wagon of FIG. 1 in the use position, showing the latch system in a locked position.
Figure 28:
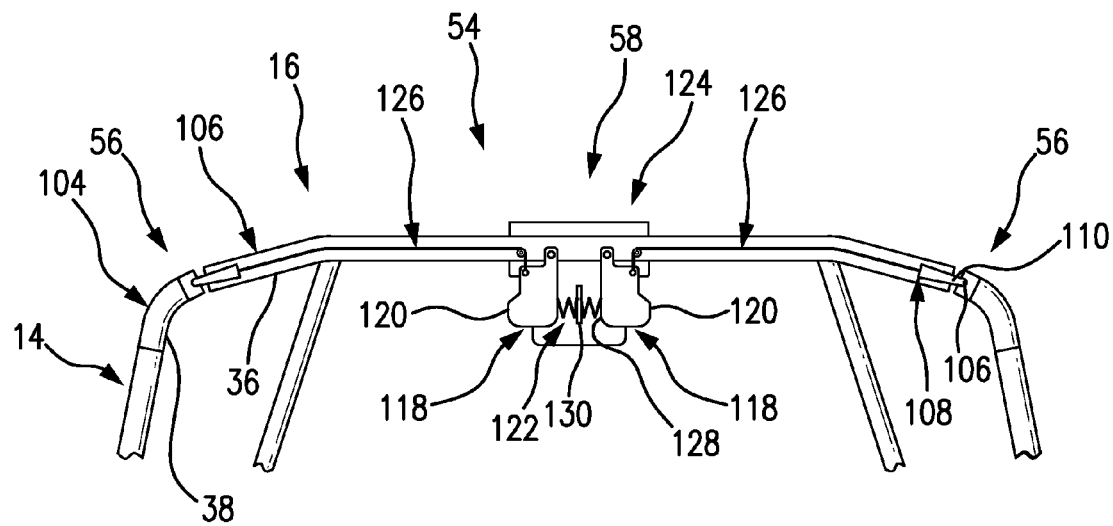
FIG. 28 is a schematic diagram of the latch system of FIG. 27, shown in the locked position securing the peripheral walls in the use position.
Figure 29:
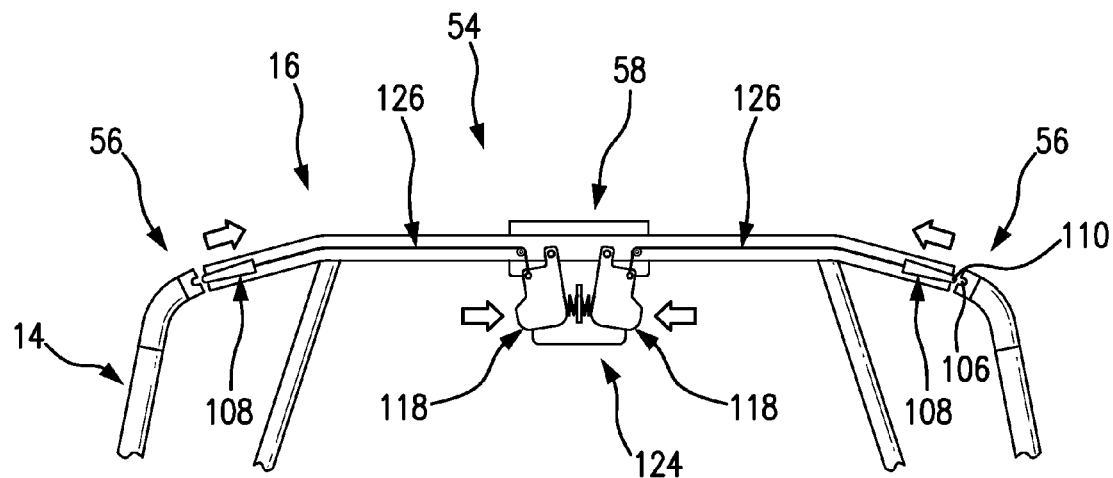
FIG. 29 shows the latch system of FIG. 27 in the unlocked position releasing the peripheral walls for pivoting to the stored position.
Figure 33:
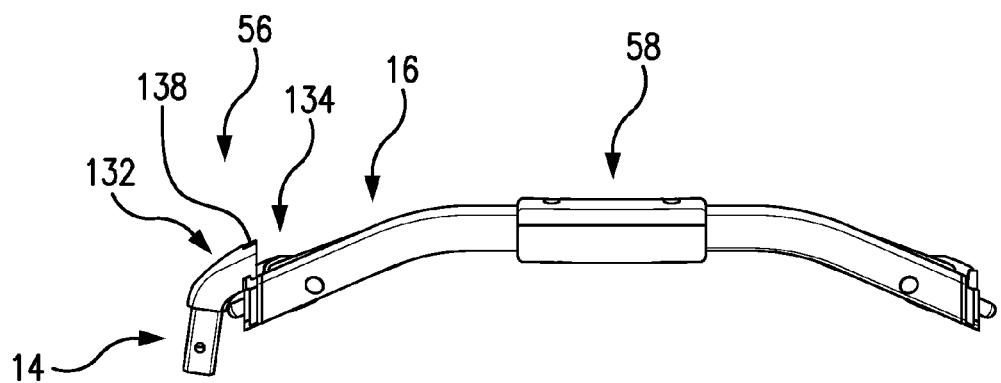
FIG. 33 is a top view of a front portion of the wagon showing the latch system and the endwall in the pivoting position of FIG. 31.
Figure 34:
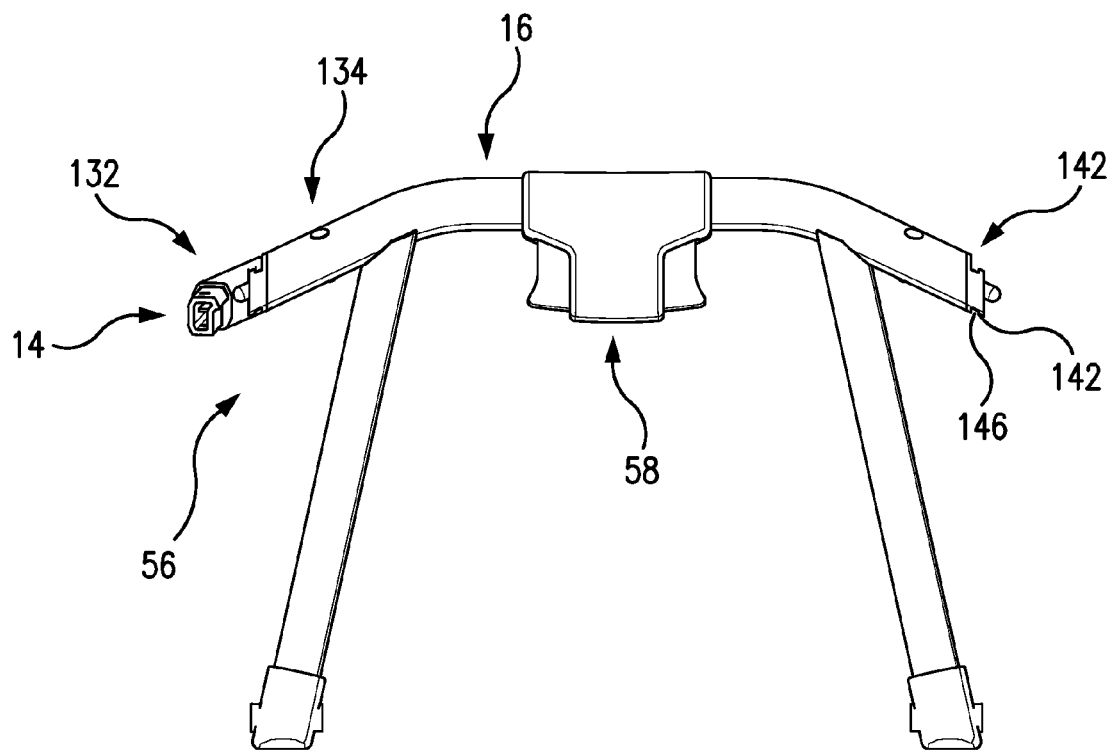
FIG. 34 is an end view of the latch system and the endwall of FIG. 33.
Figure 35:
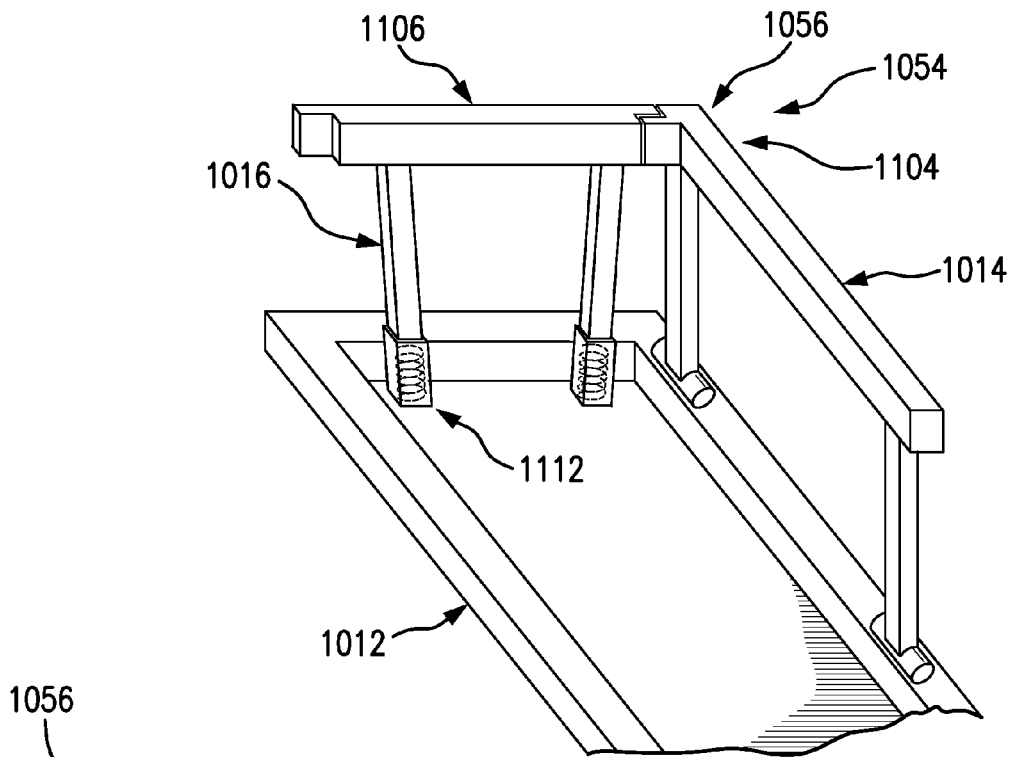
FIG. 35 is a perspective view of a portion of a latch system of a collapsible wagon according to a second example embodiment of the present invention, shown in the locked position releasably securing the peripheral walls in the unfolded use position.
Figure 36:
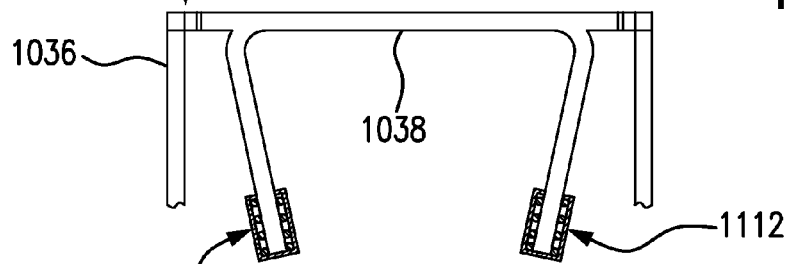
FIG. 36 is an end view of a portion of the latch system of FIG. 35.
Figure 37:
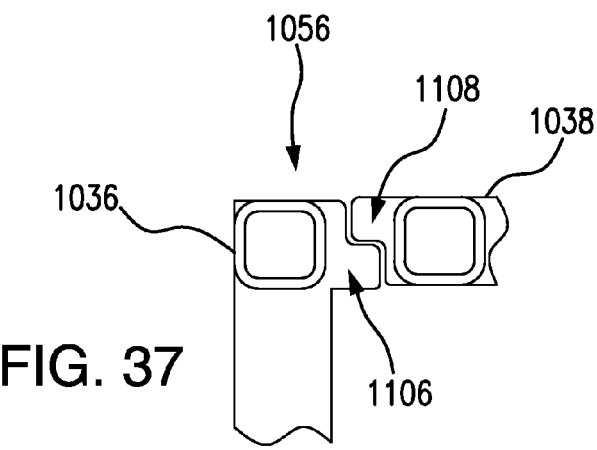
FIG. 37 is a top view of a portion of the latch system of FIG. 35.

In the depicted embodiment, the wagon 10 includes two latch systems 54, each including two latches 56 controlled by one actuator 58, and each releasably securing the ends of its respective endwall 16 to the corresponding ends of the two sidewalls 14 in the use position. The latches 56 are typically located at upper portions 104 and 106 of the sidewalls 14 and endwalls 16, respectively, for example at the upper frame members 36 and 38, to provide strength to the peripheral walls when secured together in the use position. As such, the latches 56 are generally located at the four upper corners of the wagon 10 in the unfolded use position, in which each of the endwalls 16 is adjacent to the two sidewalls 14 with the respective endwall upper portions 106 adjacent the sidewall upper portions 104. Because the latches 56 couple the sidewalls 14 to the adjacent endwalls 16, they each include two parts, one part on the sidewall and the other part on the adjacent endwall As shown in FIGS. 27-29, the latches 56 each include a receiver 106 formed on one of the sidewalls 14 and a plunger 108 movably mounted to a corresponding one of the endwalls 16. For example, the receivers 106 can be located at opposite ends of each of the endwall upper frame members 38, and the plungers 108 can be located at opposite ends of each of the sidewall upper frame members 36. The plungers 108 move between a locked position (see FIGS. 27-28) and an unlocked position (see FIG. 29). In the locked position, with the peripheral walls 14/16 in their unfolded use position, the tips 110 of the plungers 108 are extended from their endwalls 16 and received in their respective receivers 106 in a blocking-type retention fit. And in the unlocked position, the plunger tips 110 are retracted relative to their endwall 16 and thereby retracted from their respective receivers 106 to release the peripheral walls 14/16 to fold to their storage position. The endwalls 16 typically include an internal bore (e.g., when provided by tubular frame members) within which the plungers 16 are retracted to the unlocked position.

The plungers 108 are biased toward the locked position by springs 112. For example, the plunger springs 112 can each be provided by a compression coil spring retained between a bearing surface 114 of the plunger 108 and a bearing surface 116 of the endwall 16. In other embodiments, other types of spring elements can be used, such as torsion, tension, or leaf springs, or other resiliently deformable elements.

In the depicted embodiment, the plungers 108 are in the form of linearly reciprocating fingers and the receivers 106 are in the form of recesses that receive the tips of the fingers. In other embodiments, the plungers are in the form of pivoting hooks and the receivers are in the form of transverse pins about which the hooks can pivotally lock. And in still other embodiments, the plungers and receivers are of other conventional types understood by persons of ordinary skill in the art to provide the releasable securement functionality described herein.

The actuators 58 are operable to retract the respective plungers 108 to their unlocked positions. The actuators 58 typically include one or more (e.g., the depicted two) bodies 118 each having a contact surface 120 where the user contacts and applies a force to move the actuator body from a locked position (see FIGS. 27-28) to an unlocked position (see FIG. 29), one or more (e.g., the depicted two) springs 122 that bias the actuator bodies to the locked position, and a housing 124 for the actuator bodies. A connection 126 interconnects the actuator body 118 to the plunger 108, so that applying an operating force to the actuator body to move it from the locked position to the unlocked position causes the plunger 108 to move from its locked position to its unlocked position.

In the depicted embodiment, the actuator bodies 118 are pivotally mounted, for example to the actuator housing 124 (or to the endwall 14), so that they pivot between the locked and unlocked positions. In other embodiments, the actuator bodies slide or rotate between the locked and unlocked positions. In the depicted embodiment, the connection 126 between the actuator body 118 and the plunger 108 is a cable, for example a wire, cord, string, or other flexible elongated element. In other embodiments, the connection is in the form of a rigid rod, a mechanical linkage, or a gear-set. In the depicted embodiment, pivoting the actuator body 118 from the locked to the unlocked position generates a pulling force on the connection 126. In other embodiments, moving the actuator body from the locked to the unlocked position generates a pushing or rotary force on the connection. In the depicted embodiment, the actuator springs 122 are each provided by a compression coil spring retained between a bearing surface 128 of the actuator body 118 and a bearing surface 130 of the actuator housing 124. In other embodiments, other types of spring elements can be used, such as torsion, tension, or leaf springs, or other resiliently deformable elements. In the depicted embodiment, the actuator 58 includes two actuator bodies 118 and two actuator springs 122, one set for each respective one of the plungers 108. In other embodiments, the actuator includes one actuator body and one actuator spring for unlocking both plungers.

In use, as shown in FIG. 29, operating forces can be applied (as indicated by the two inner directional arrows) to the actuator bodies 118 to pivot them from their locked to their unlocked positions, which causes the plungers 108 to retract (as indicated by the two outer directional arrows) from their locked to their unlocked positions. In this way, each of the actuators 58 can be operated by one hand of a user (e.g., by wrapping a hand around the actuator housing 124, with the thumb on one actuator body and one or more of the other fingers on the other actuator body, then squeezing) to release its endwall 16 from its sidewall 14 in the use position so the walls can then be folded down to the storage position.

Referring additionally to FIGS. 30-34, details of the minimized-play feature of the latch system 54 of the depicted embodiment will now be provided. The latch end 132 of a sidewall 14 and the latch end 134 of an adjacent endwall 16 have interfering positions (in conflict because of their physical inability to occupy the same space) when the peripheral walls are in the unfolded use position. But at least one of the peripheral walls includes a ramped surface 136 along which the other peripheral wall rides immediately before it reaches the unfolded use position, and at least one of the peripheral walls resiliently displaces outward (out of its interfering position) under outward forces generated by the ramp being ridden across, thereby providing clearance for the pivoting wall to reach its use position.

In the depicted embodiment, there are cooperating ramped surfaces 136 on both the sidewall latch end 132 and the endwall latch end 134. In other embodiments, only the sidewall latch end or the endwall latch end includes a displacement ramp. In the depicted embodiment, the sidewall upper frame member 36 deflects outward, and as such has a sufficient length (between its latch end 132 and the frame connector 44) and is made of a material (e.g., with sufficient elastic deformation properties) selected to permit this resilient displacement. In other embodiments, the sidewall includes a spring-biased joint that permits this resilient displacement and a stop member to prevent over-displacement. In the depicted embodiment, the sidewall latch end 132 displaces slightly, typically less than about 1/10 inch, though in other embodiments the peripheral wall displacement can be greater or lesser.

In use, FIG. 30 shows the endwall 16 pivoting up and approaching its upright use position (as indicated by the directional arrow). FIG. 31 shows the endwall 16 further pivoting (as indicated by the corresponding directional arrow) to where it comes into contact with the sidewall 14 (in its neutral interfering position), causing the cam-like ramps 136 of the two walls to ride along each other, which in turn pushes outward on and thereby causes the sidewall to displace outward (as indicated by the corresponding directional arrow) for clearance. At the same time, the sidewall ramp 136 pushes (as indicated by the corresponding directional arrow of FIG. 31) the plunger 108 into the unlocked position for clearance. Now the sidewall latch end 132 and the endwall latch end 134 are no longer in interfering positions, and FIG. 32 shows the endwall 16 further pivoted (as indicated by the corresponding directional arrow) into its use position, with the plunger 108 resiliently returning to its locked position (as indicated by the corresponding directional arrow).

Because in the use position the sidewall 14 is under a slight shear stress from and deflected slightly outward by the endwall 16, it stores a charge such that its latch end 132 applies a compression force on the endwall. In this way, there is no "play" in the system, that is, the sidewall 14 and adjacent endwall 16 are connected by a fit that is pressured tight (not loose, no slack or excess space between them) so the sidewall and endwall are held tightly together and cannot wiggle relative to each other.

After use of the wagon 10, the actuator 58 can be operated to release the endwall 16, then the endwall can be folded down out of its use position. The reverse displacement process then occurs, with the sidewall 14 resiliently returning to its neutral inward interfering position.

In addition, the sidewall latch end 132 can include a stop member 138 that limits the adjacent endwall latch end 134 from pivoting past its use position (see FIG. 32). In the depicted embodiment, for example, the sidewall latch end 132 includes a stop member 138 in the form of a laterally extending wall against which the adjacent endwall latch end 134 abuts in its use position to limit further travel. In other embodiments, the stop member 138 can be in the form of a laterally extending pin or other protrusion.

Furthermore, the sidewall latch end 132 and the endwall latch end 134 can include lateral retainers 140 and 142, respectively. The lateral retainers 140 and 142 hold the sidewall 14 and the endwall 16 from lateral outward displacement from their use positions (the latch system 54 holds them from pivoting beyond their use positions). In the depicted embodiment, for example, the sidewall retainer 140 is in the form of at least one retainer wall extending transversely from the sidewall latch end 132 (e.g., extending transversely from the outer-positioned sidewall stop member 138), thereby defining a retainer opening 144. The sidewall retainer can additionally or alternatively include one or more retainer walls extending from the top and/or bottom of the sidewall latch end 132, as depicted. And the endwall retainer 142 is in the form of at least one retainer wall extending transversely from a neck 146 that extends longitudinally from the endwall latch end 134, thereby defining a retainer opening 148. In other embodiments, the retainers 140 and 142 are in the form of transversely extending pins or other protrusions.

With the sidewall 14 and the endwall 16 in their use positions, the endwall retainer 142 is positioned behind the sidewall retainer 140 and thus received in the sidewall retainer opening 144 (see FIG. 32). And the sidewall retainer 140 is positioned behind the endwall retainer 142 and thus received in the endwall retainer opening 148. In this way, the lateral retainers 140 and 142 hold the sidewall 14 and the endwall 16 from lateral displacement outward in their use positions, as the respective mechanical stops prevent further pivoting but not necessary deflection.

Having discussed the structure and operation of this embodiment, details of additional embodiments will now be described. FIGS. 35-40 show a portion of a latch system 1054 of a collapsible wagon 1010 according to a second example embodiment of the present invention. The wagon 1010 of this embodiment is substantially similar to that of the first example embodiment described above, with some differences as will be noted.

In this embodiment, the latch system 1054 still releasably secures the endwalls 1016 to the sidewalls 1014 at upper portions 1104 and 1106 of the walls. But instead of operating a discrete actuator (coupled to the latches by a connection) to manipulate the latches 1056 from their locked to unlocked positions, this is done by applying an upward force (e.g., pulling) on the endwall 1016. So the endwall 1016 effectively functions as an actuator in additional to functioning to define the wagon interior. The latches 1056 each include a retainer (the receiver) 1106 on the sidewall 1014 and a catch (the plunger) 1108 on the endwall 1016. The retainer 1106 can be in the form of a wall extending from the sidewall 1014 and the catch 1108 can be in the form of a wall extending from the endwall 1016, or they can be provided in other conventional forms to provide the functionality described herein. In the use position, the catch 1108 is engaged and laterally blocked by the retainer 1106 from pivoting inward, thereby preventing the endwall 1016 from folding toward its storage position by retaining it in its use position. The endwall 1016 is biased downward by a spring 1112, for example a compression coil spring in a housing that is mounted to the base 12 and that is positioned between a bearing surface of the endwall and a bearing surface of the spring housing mounted to the base 12, or another conventional spring element and arrangement. In addition, with the endwalls 1016 and sidewall 1014 in their use positions, the sidewall retainer 1106 abuts against the endwall, and/or the endwall receiver abuts against the sidewall, to retain the sidewall in its use position.

Figure 38:
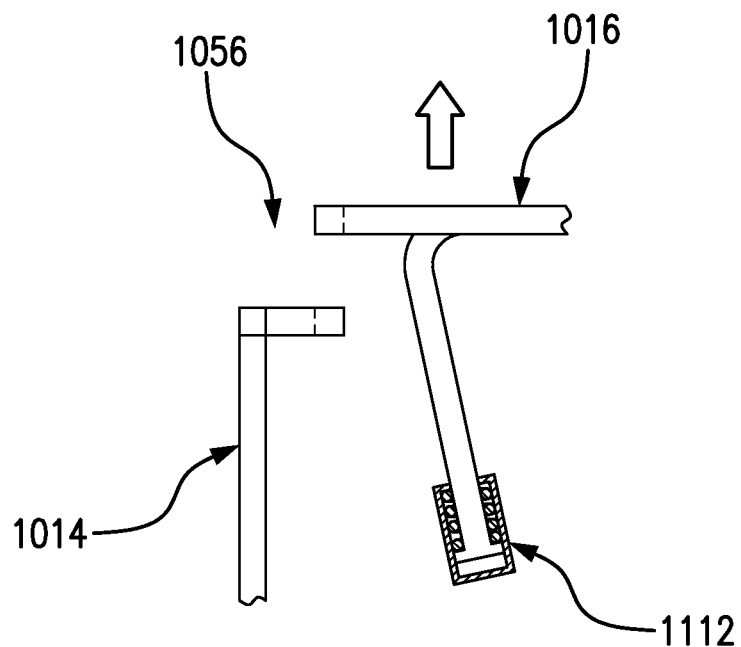
FIG. 38 is a schematic diagram of a portion of the latch system of FIG. 35, showing the end wall being released from the sidewall.
Figure 39:
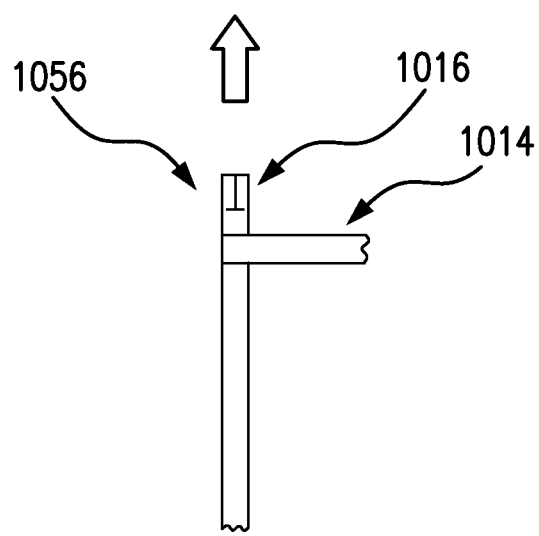
FIG. 39 is a side view of the latch system portion of FIG. 38.
Figure 40:
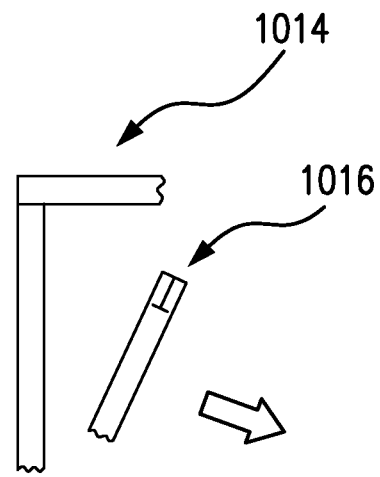
FIG. 40 shows the latch system portion of FIG. 39 with the end wall being pivoted toward the folded storage position.

In use, with the endwall 1016 locked by the latch 1056 in the use position (see FIGS. 35-37), a user moves the endwall generally upward relative to the adjacent sidewall 1014 it is latched to (see FIGS. 38-39). This upward movement of the endwall 1016 is against the force of the spring 1112, so this charges the spring (see FIGS. 36 and 38). And this upward movement of the endwall 1016 clears the catch 1108 from being laterally blocked by the retainer 1018 (see FIGS. 38-39), so the endwall is now folded downward from its use position toward its storage position (see FIG. 40). The endwall 1016 can be released (i.e., the upward force can be removed), and it will retract to its neutral position under the discharging force of the spring 1112. After both endwalls 1016 are folded, the sidewalls 1014 are free to be folded too. To return the endwall 1016 to its use position, the process is reversed, with the endwall pulled so the catch 1108 can pivotally clear the retainer 1106 to get the endwall to the use position, then the endwall is released to drop it downward and latch it in place relative to the sidewall 1014.

Figure 41:
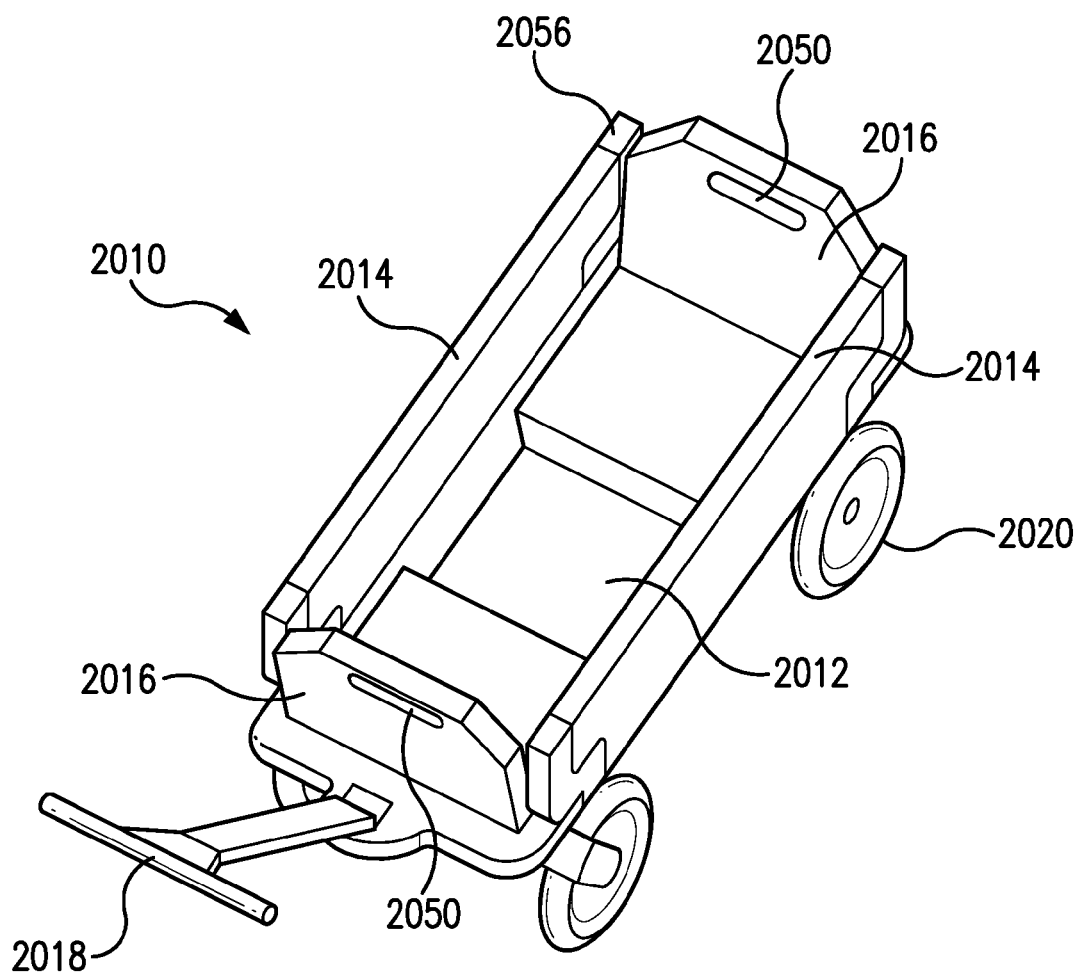
FIG. 41 is a perspective view of a collapsible wagon according to a third example embodiment of the present invention, shown with its peripheral walls unfolded in the use position.

FIG. 41 shows a collapsible wagon 2010 according to a third example embodiment of the present invention. The wagon 2010 of this embodiment is substantially similar to that of the first example embodiment described above, for example, it includes a base 2012, sidewalls 2014, endwalls 2016, a handle 2018, and wheels 2020, but with some differences as will be noted.

In this embodiment, the latches 2056 can be of the same type as of the second embodiment described above. To facilitate the lifting motion on the endwalls 2016 to release and lock the endwalls to the sidewalls 2014, the endwalls can include handles 2050. In addition, the sidewalls 2014 and the endwalls 2016 are in the form of solid walls instead of the frame-and-soft-cover design of the first embodiment.

Figure 42:
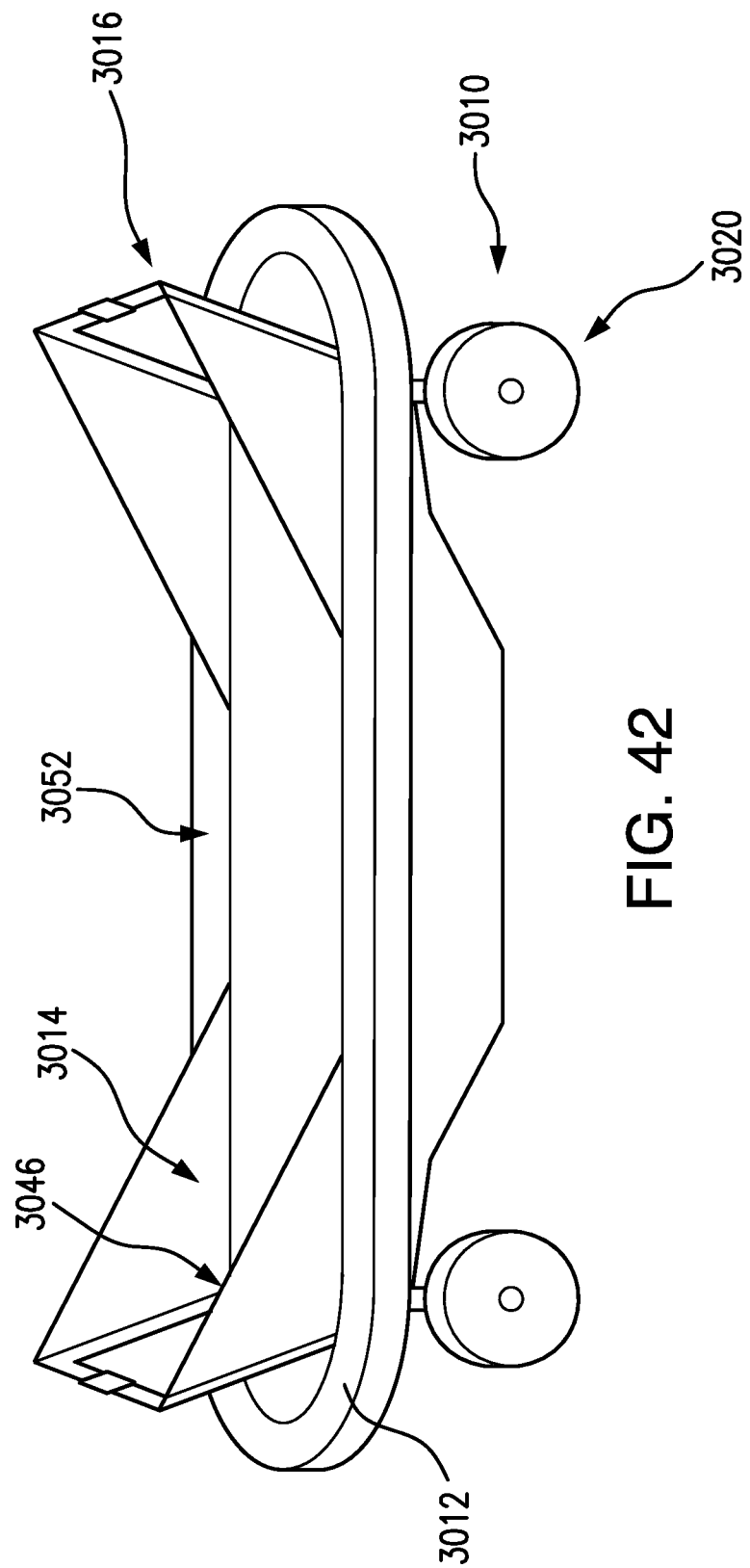
FIG. 42 is a perspective view of a collapsible wagon according to a fourth example embodiment of the present invention, shown with its endwalls unfolded in the use position.
Figure 43:
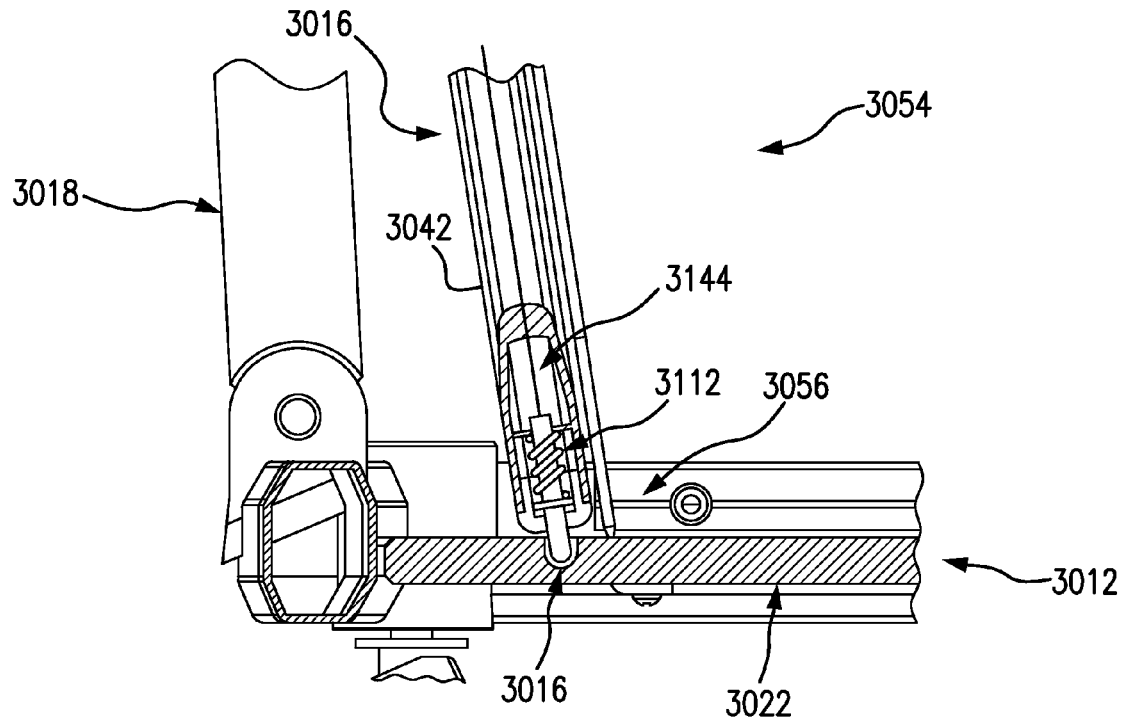
FIG. 43 is a cross-sectional view of a portion of a latch system of the collapsible wagon of FIG. 42, shown in a locked position releasably securing a wagon endwall in the use position.
Figure 44:
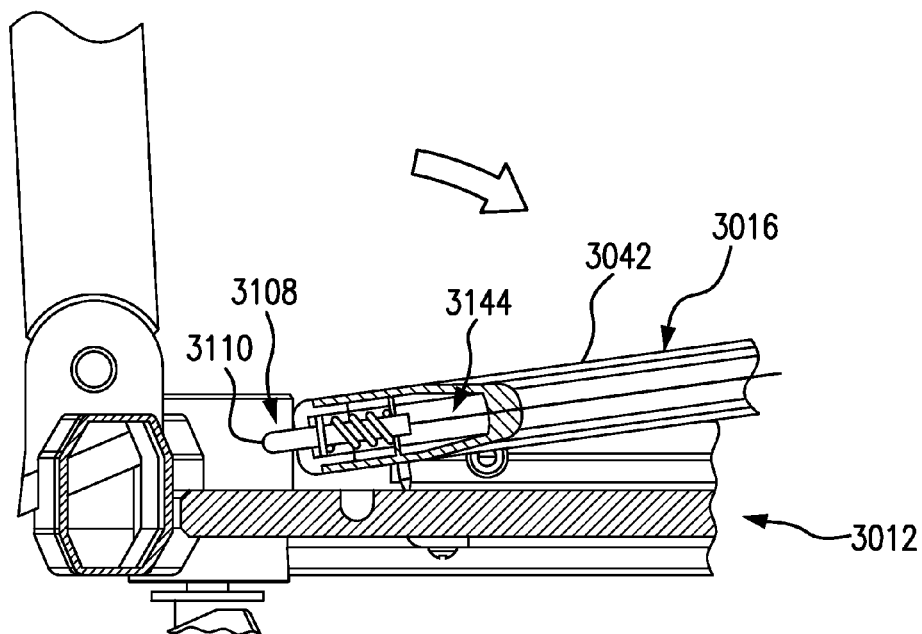
FIG. 44 shows the latch system portion of FIG. 43 in an unlocked position with the endwall released to pivot to the folded storage position.

FIGS. 42-44 show a collapsible wagon 3010 according to a fourth example embodiment of the present invention. The wagon 3010 of this embodiment is substantially similar to that of the first example embodiment described above, for example, it include a base 3012, sidewalls 3014, endwalls 3016, a handle 3018, and wheels 3020, but with some differences as will be noted.

Referring to FIG. 42, in this embodiment the sidewalls 3014 do not include sidewall frames, and so the sidewall flexible covers 3046 extend between and are mounted to the adjacent endwall 3016 and a longitudinal midsection 3052 of the base 3012, with two sidewall covers (front and rear) per side. When the endwalls 3016 are in the use position, the sidewall covers 3046 are generally pulled taut, and in the storage position they fold into the interior of the wagon 3010.

FIGS. 43-44 show a latch system 3054 that can be used with the wagon 3010 of this embodiment (or other of other embodiments). The latch system 3056 releasably secures the endwalls 3016 to the base 3012 in the use position. The latch system 3054 includes latches 3056 each including a receiver 3016 on the base 3012 (for example in the base frame 3022) and a plunger 3018 on the endwall 3016. The plunger 3018 moves between a locked position with its tip 3110 extended into the receiver (see FIG. 43) and an unlocked position with its tip retracted from the receiver (see FIG. 44). The plungers 3018 are located at lower portions of the endwalls 3016, for example at lower ends of their connecting frame members 3042. Springs 3112 are provided to bias the plungers 3018 toward their extended locked positions. An actuator (not shown) is included to actuate the plungers 3018 via a connection 3144 that operably connects the actuator to two of the plungers 3018 (one at each end of the endwall 3016). The receivers 3016, plungers 3018, springs 3112, connections 3144, and actuator can be of the same or a modified type as in the first embodiment. As such, this latch system 3054 is similar to that of the first embodiment in many regards, except for the lower (instead of upper) location of the latches. In other embodiments, the receivers are located on the peripheral walls (endwall or sidewalls), and the plungers and actuator are located on the base. In some such embodiments, a single actuator (e.g., in the form of a foot pedal) on the base controls a plurality of the plungers, for example four latches at the four corners of the base, to lock and unlock the endwalls and/or the sidewalls.

Figure 45:
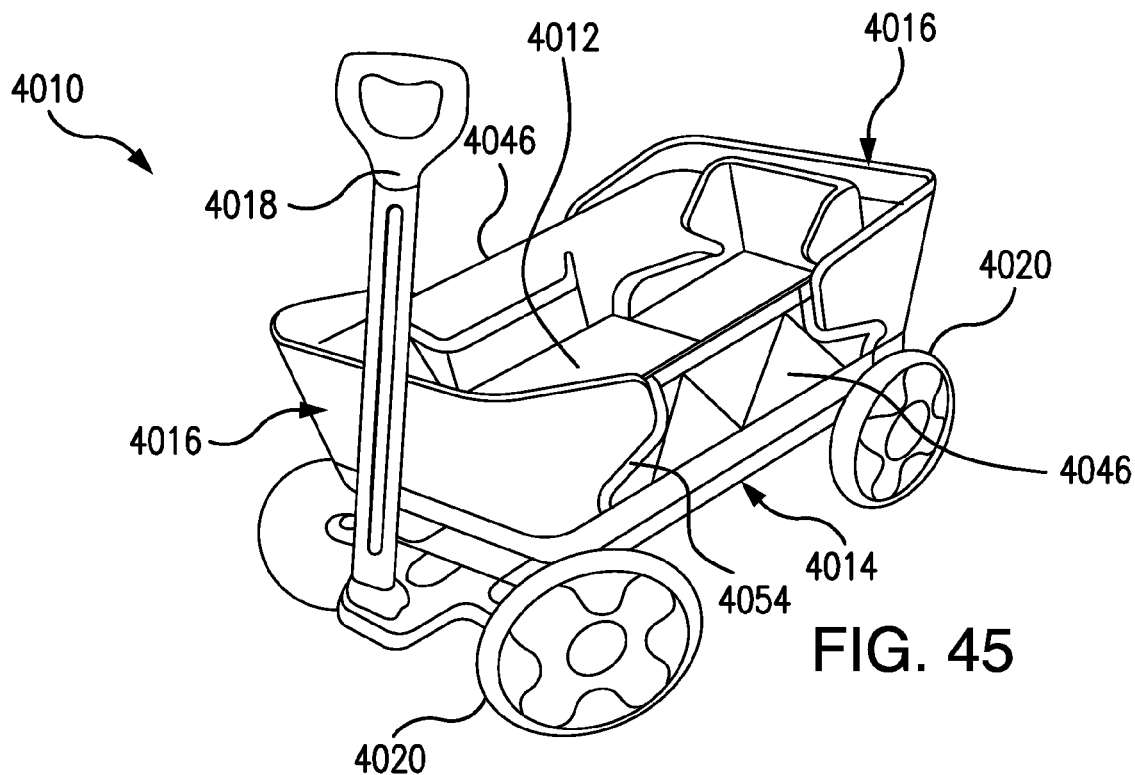
FIG. 45 is a perspective view of a collapsible wagon according to a fifth example embodiment of the present invention, shown with its endwalls unfolded in the use position.
Figure 46:
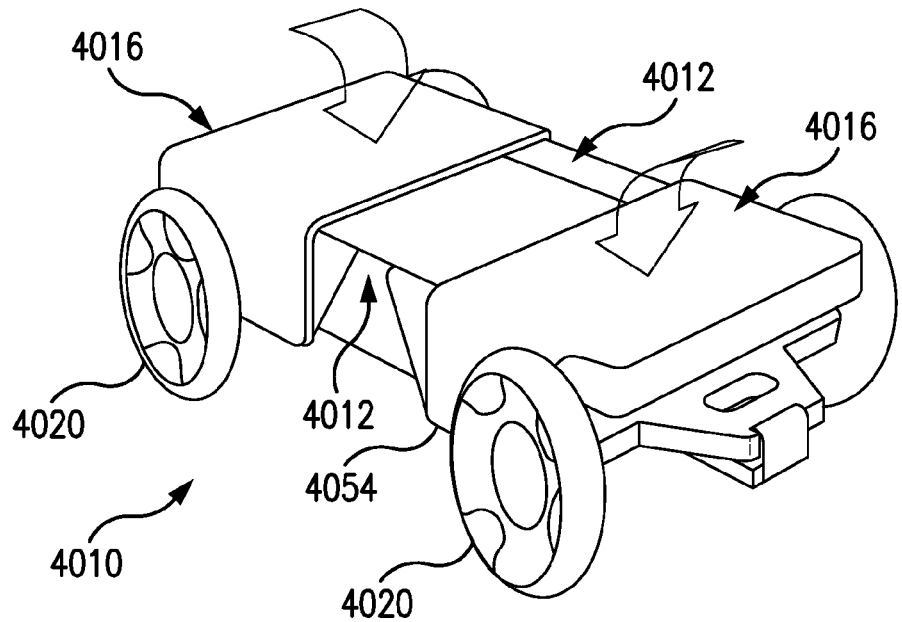
FIG. 46 is a perspective view of the collapsible wagon of FIG. 45, shown with its endwalls folded in the storage position.

FIGS. 45-46 show a collapsible wagon 4010 according to a fifth example embodiment of the present invention. The wagon 4010 of this embodiment is substantially similar to that of the fourth example embodiment described above, for example it includes a base 4012, sidewalls 4014, endwalls 4016, a handle 4018, and wheels 4020, but does not include sidewall frames, with differences as will be noted.

In this embodiment, the sidewall flexible covers 4046 extend between and are mounted to the endwalls 4016 of each side, so there is one on each side forming a continuous sheet. When the endwalls 4016 are in the use position the sidewall covers 4046 are generally pulled taut (see FIG. 45), and in the storage position they fold onto (or into) the base 4012 of the wagon 4010 (see FIG. 46). In addition, the endwalls 4016 are in the form of solid walls, and the sidewalls 4014 are formed by the sidewall covers 4046 and wing walls 4154 extending from the endwalls.

It is to be understood that the various features described herein can be combined in various ways to form various embodiments not specifically detailed herein but still contemplated by the inventors. As such, this invention expressly includes each individual feature disclosed herein as well as every combination of those features.

Furthermore, it is to be understood that this invention is not limited to the specific devices, methods, conditions, and/or parameters of the example embodiments described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "the" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the claimed invention has been shown and described in example forms, it will be apparent to those skilled in the art that many modifications, additions, and deletions can be made therein without departing from the spirit and scope of the invention as defined by the following claims.

What is claimed is:

1. A wagon for cargo, comprising:
   a base;
   at least first and second walls that extend generally upright from the base in a use position to help hold the cargo, wherein the second wall is movably mounted to the base and moves relative to the base between the upright use position and a storage position collapsed into a compact arrangement; and
   a minimized-play feature including at least one ramped surface on one of the first and second walls, an interference between the first and second walls, and a resilient deflection feature of the first wall, wherein when the second wall is moved from the collapsed storage position toward the upright use position, the first and second walls interfere with each other, the ramped surface of the first or second wall slidingly engages the other one of the first and second walls to generate a lateral displacement force, the first wall is resiliently displaced generally laterally by the lateral displacement force as permitted by the resilient deflection feature to provide clearance for the second wall to move into the upright use position, and the resilient displacement of the first wall generates a compression force on the second wall in the upright use position so that the first and second walls are held together tightly under pressure to prevent wiggling relative to each other.

2. The wagon of claim 1, wherein the at least one ramped surface includes a first ramped surface on the first wall and a second ramped surface on the second wall that engage each other when the second wall is moved into the upright use position.

3. The wagon of claim 1, wherein the resilient deflection feature of the first wall includes a portion of the first wall being made of a material with an elastic deformation property sufficient to permit the resilient displacement of the first wall.

4. The wagon of claim 3, wherein the at least one ramped surface is positioned on an upper portion of the first or second wall.

5. The wagon of claim 1, wherein the first and second walls include first and second retainers, respectively, that engage each other when the first and second walls are in the upright use position to prevent the first wall from lateral displacement past the upright use position.

6. The wagon of claim 5, wherein the first and second retainers are in the form of retainer walls extending transversely from the first and second walls, respectively.

7. The wagon of claim 6, wherein the first retainer wall at least partially defines a first retainer opening of the first wall that receives the second retainer wall of the second wall in the upright use position, and the second retainer wall at least partially defines a second retainer opening of the second wall that receives the first retainer wall of the first wall in the upright use position.

8. The wagon of claim 1, further comprising a stop member that the second wall abuts against in the upright use position and that prevents the second wall from moving past the upright use position and out of engagement with the first wall.

9. The wagon of claim 8, wherein the stop member is defined by the first wall.

10. The wagon of claim 8, wherein the stop member is defined by a stop wall extending laterally from the first wall and from which a first retainer extends transversely, and wherein the first retainer engages the second wall in the upright use position to prevent the first wall from lateral displacement past the upright use position.

11. The wagon of claim 1, further comprising a latch system adapted to releasably secure the second wall in the upright use position, wherein the latch system includes at least one plunger on one of the first and second walls and at least one receiver on the other one of the first and second walls, wherein in a locked position the plunger is extended into the receiver securing the first and second walls together in the upright use position and in an unlocked position the plunger is retracted from the receiver not preventing the second wall from moving out of the upright use position.

12. The wagon of claim 11, wherein the at least one ramped surface is formed on the first wall, and when the second wall is moved toward the upright use position the ramped surface slidingly engages and pushes on the plunger to retract the plunger into the unlocked position, and when the second wall reaches the upright use position the plunger aligns with and is spring-based into the receiver into the locked position.

13. The wagon of claim 11, wherein in the locked position the plunger received in the receiver prevents the second wall from moving past the upright use position.

14. The wagon of claim 11, wherein the plunger and the receiver are positioned at upper portions of the respective walls.

15. A collapsible consumer-use wagon for cargo, comprising:
    a base with a plurality of wheels mounted thereto;
    four peripheral walls that extend generally upright from the base in a use position to help hold the cargo, that are pivotally mounted to the base to pivot relative to the base between the upright use position and a folded position for storage, and cooperating in the upright use position to form a container for holding the cargo;

a latch system adapted to releasably secure a second one of the walls to adjacent first and third ones of the walls when the walls are in the upright use position with the second wall extending between the first and third walls, wherein the latch system includes at least one plunger on the second wall and at least one receiver on the first wall, wherein in a locked position the plunger is extended into the receiver securing the first and second walls together in the upright use position and in an unlocked position the plunger is retracted from the receiver not preventing the second wall from moving out of the upright use position; and a minimized-play feature including first and second ramped surfaces on the first and second walls, respectively, an interference between the first and second walls, a resilient deflection feature of the first wall, and first and second retainers on the first and second walls, respectively, wherein when the second wall is pivoted from the folded storage position toward the upright use position, the first and second walls interfere with each other, the first and second ramped surfaces of the first and second walls slidingly engage each other to generate a lateral displacement force, the first wall is resiliently displaced generally laterally by the lateral displacement force as permitted by the resilient deflection feature to provide clearance for the second wall to move into the upright use position, the resilient displacement of the first wall generates a compression force on the second wall in the upright use position so that the first and second walls are held together tightly under pressure to prevent wiggling relative to each other, and the first and second retainers engage each other in the upright use position to prevent the first wall from lateral displacement past the upright use position.

16. The wagon of claim 15, wherein the resilient deflection feature of the first wall includes a portion of the first wall being made of a material with an elastic deformation property sufficient to permit the resilient displacement of the first wall.

17. The wagon of claim 15, wherein the first and second retainers are in the form of retainer walls extending transversely from the first and second walls, respectively, wherein the first retainer wall at least partially defines a first retainer opening of the first wall that receives the second retainer wall of the second wall in the upright use position, and the second retainer wall at least partially defines a second retainer opening of the second wall that receives the first retainer wall of the first wall in the upright use position.

18. The wagon of claim 15, further comprising a stop member that the second wall abuts against in the upright use position and that prevents the second wall from moving past the upright use position and out of engagement with the first wall, wherein the stop member is defined by a stop wall extending laterally from the first wall and from which the first retainer extends transversely.

19. The wagon of claim 15, wherein when the second wall is moved toward the upright use position the first ramped surface slidingly engages and pushes on the plunger to retract the plunger into the unlocked position, and when the second wall reaches the upright use position the plunger aligns with and is spring-based into the receiver into the locked position, wherein in the locked position the plunger received in the receiver prevents the second wall from moving past the upright use position and out of engagement with the first wall.

20. The wagon of claim 15, wherein the plunger and the receiver, and the first and second ramped surfaces, are positioned at upper portions of the respective walls.

* * * * *